United States Patent [19]

Moribe

[11] Patent Number: 4,529,921

[45] Date of Patent: Jul. 16, 1985

[54] TRACKING CONTROL SYSTEM OF MULTIJOINT ROBOT

[75] Inventor: Hiroshi Moribe, Aichi, Japan

[73] Assignee: Kabushiki Kaisha Toyota Chuo Kenkyshuo, Aichi, Japan

[21] Appl. No.: 560,012

[22] Filed: Dec. 9, 1983

[30] Foreign Application Priority Data

Dec. 10, 1982 [JP] Japan ................. 57-215589

[51] Int. Cl.³ ............................................. G05B 19/42
[52] U.S. Cl. ...................................... 318/568; 318/567
[58] Field of Search ................ 318/568, 567, 590, 569

[56] References Cited

U.S. PATENT DOCUMENTS 4,163,183  7/1979  Engelberger et al. ............... 318/568

Primary Examiner—William M. Shoop
Assistant Examiner—Saul M. Bergmann

[57] ABSTRACT

In a tracking control system of a multijoint robot, a change in posture of an end of a tool attached to a hand of a robot arm is defined as rotation about a rotational main axis of the tool. An arc traced by an imaginary point which is in a plane perpendicular to the rotational main axis and which is spaced apart by a predetermined distance from the rotational main axis is synthesized with a straight line traced by the imaginary point upon translational motion of the end of the tool, thereby producing a helical trajectory. A velocity pattern is given to this helical trajectory, and a translational velocity pattern and a rotational velocity pattern are derived as components from the velocity pattern given to the helical trajectory. Servo control is smoothly performed to control joint variables so as to provide a target position/posture tracking output which prevents abrupt changes.

17 Claims, 29 Drawing Figures

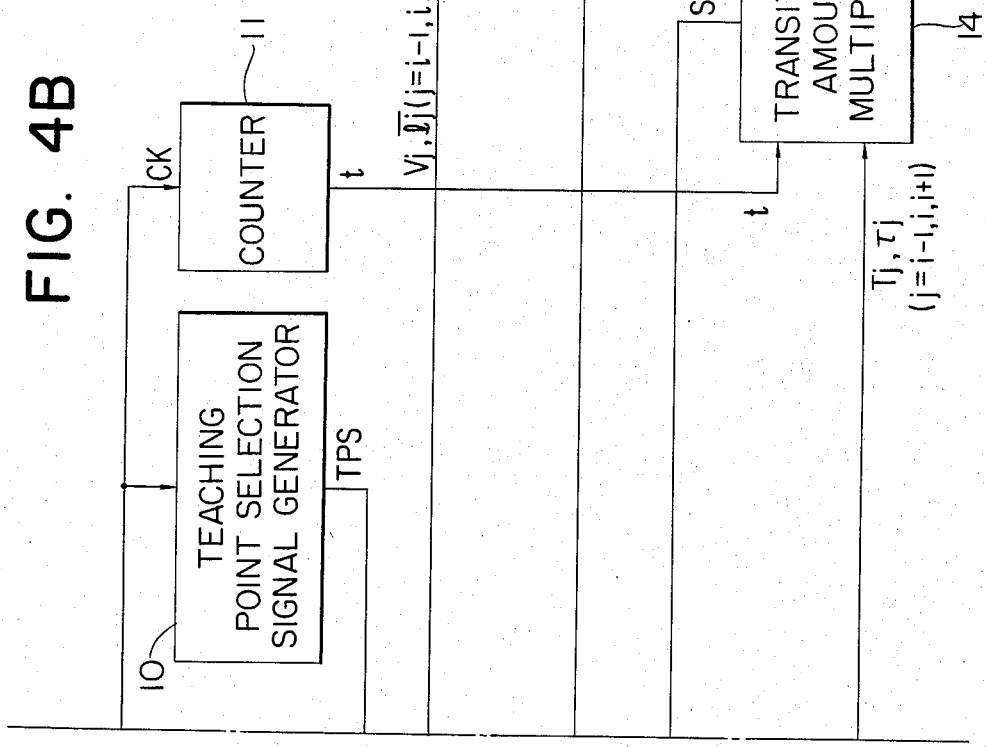

FIG. 5
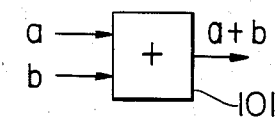 101
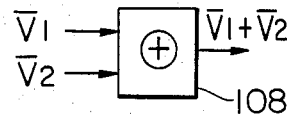 108
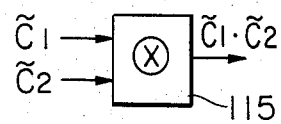 115
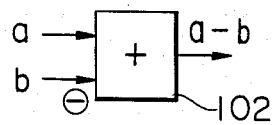 102
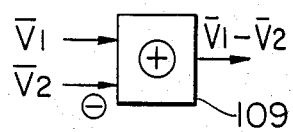 109
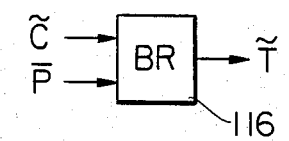 116
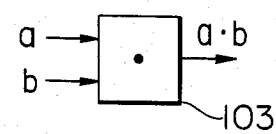 103
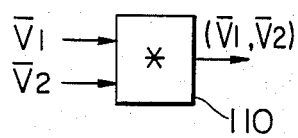 110
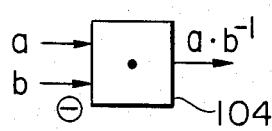 104
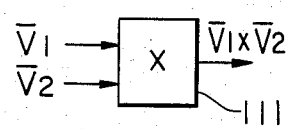 111
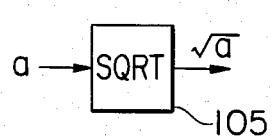 105
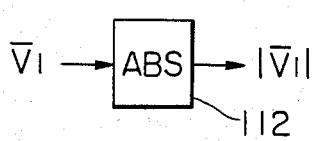 112
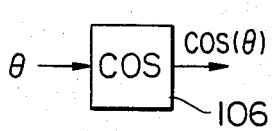 106
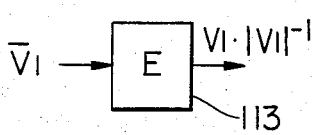 113
 107
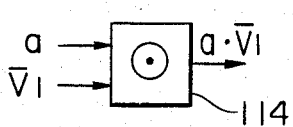 114

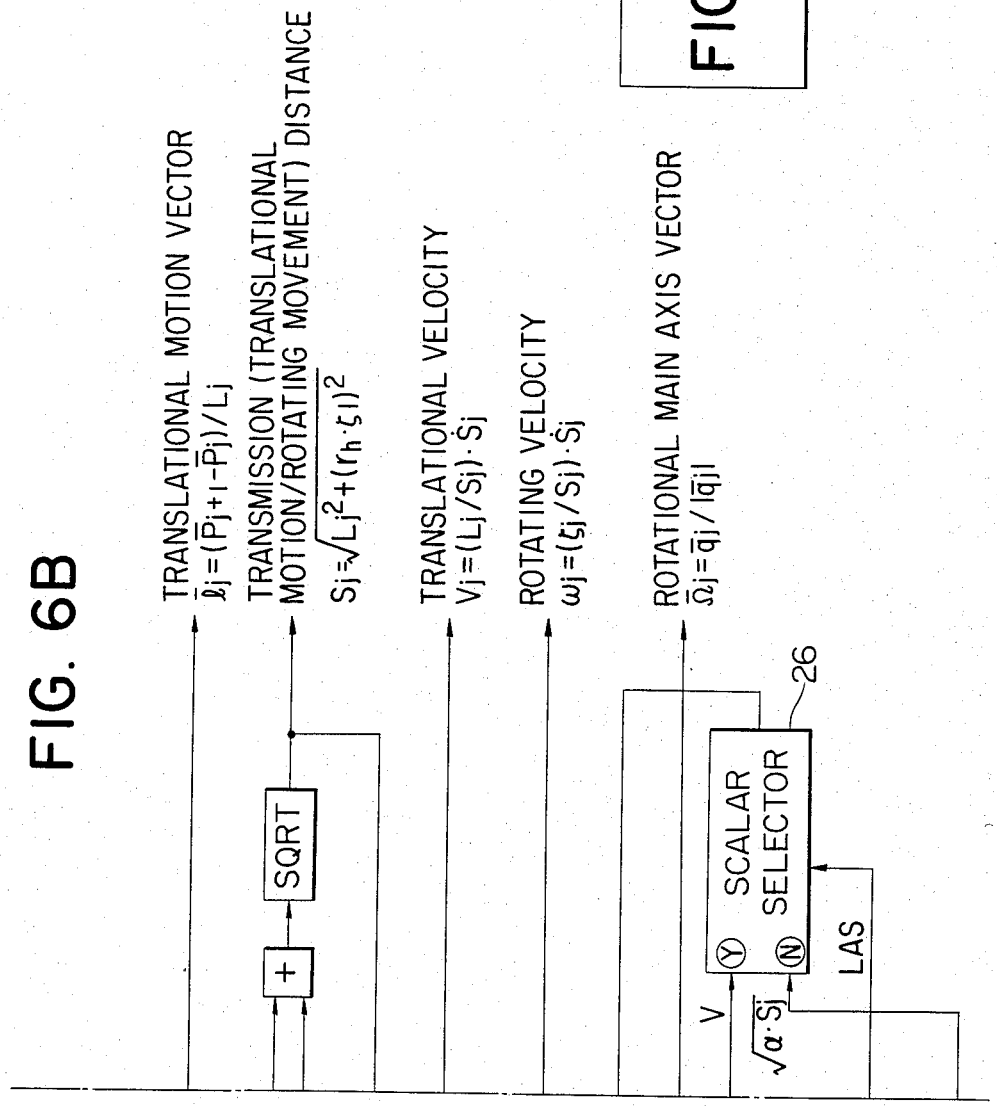

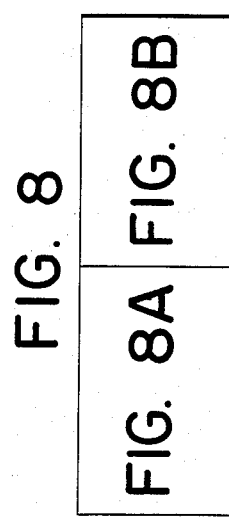
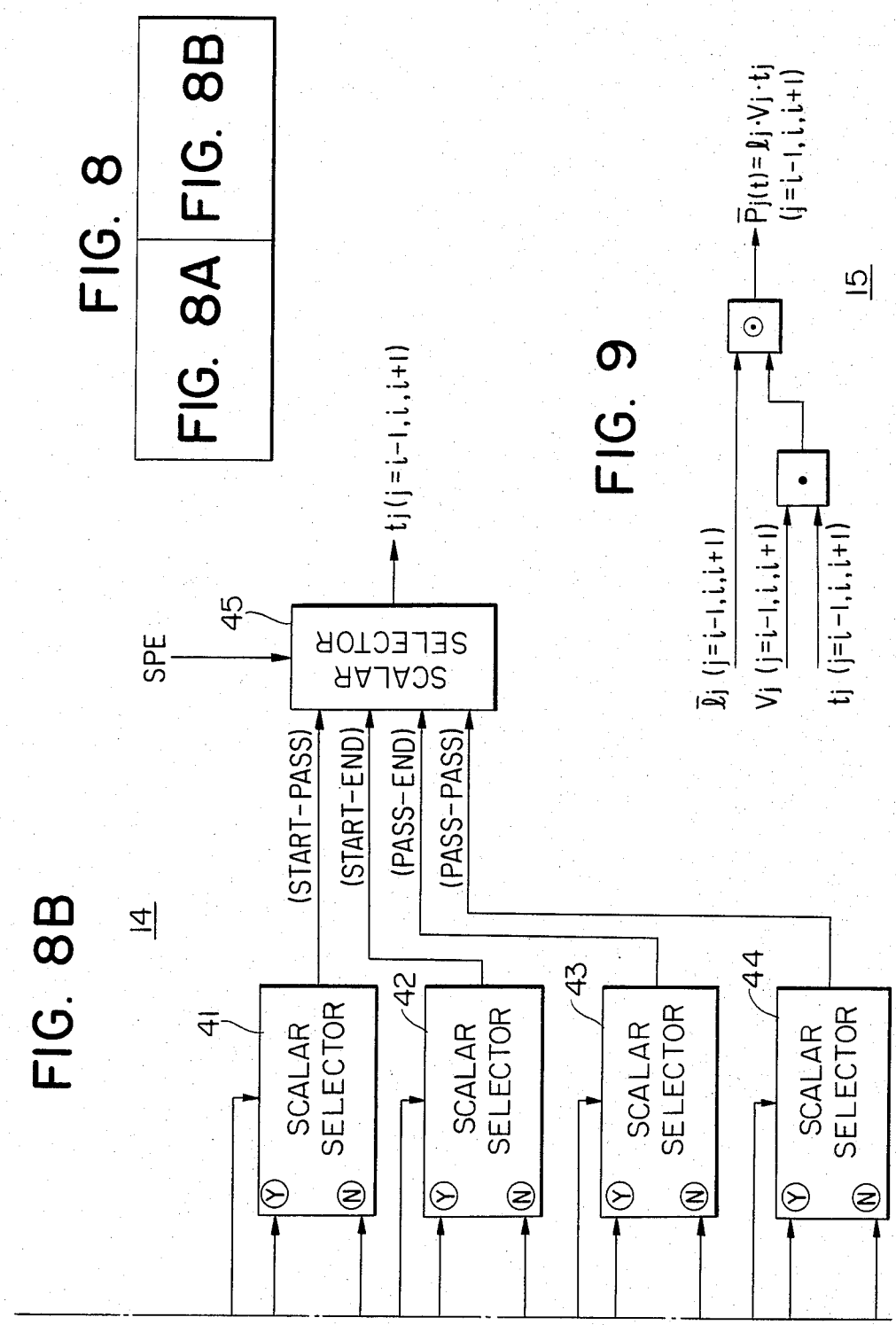
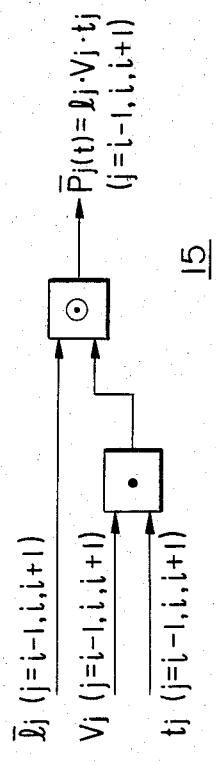

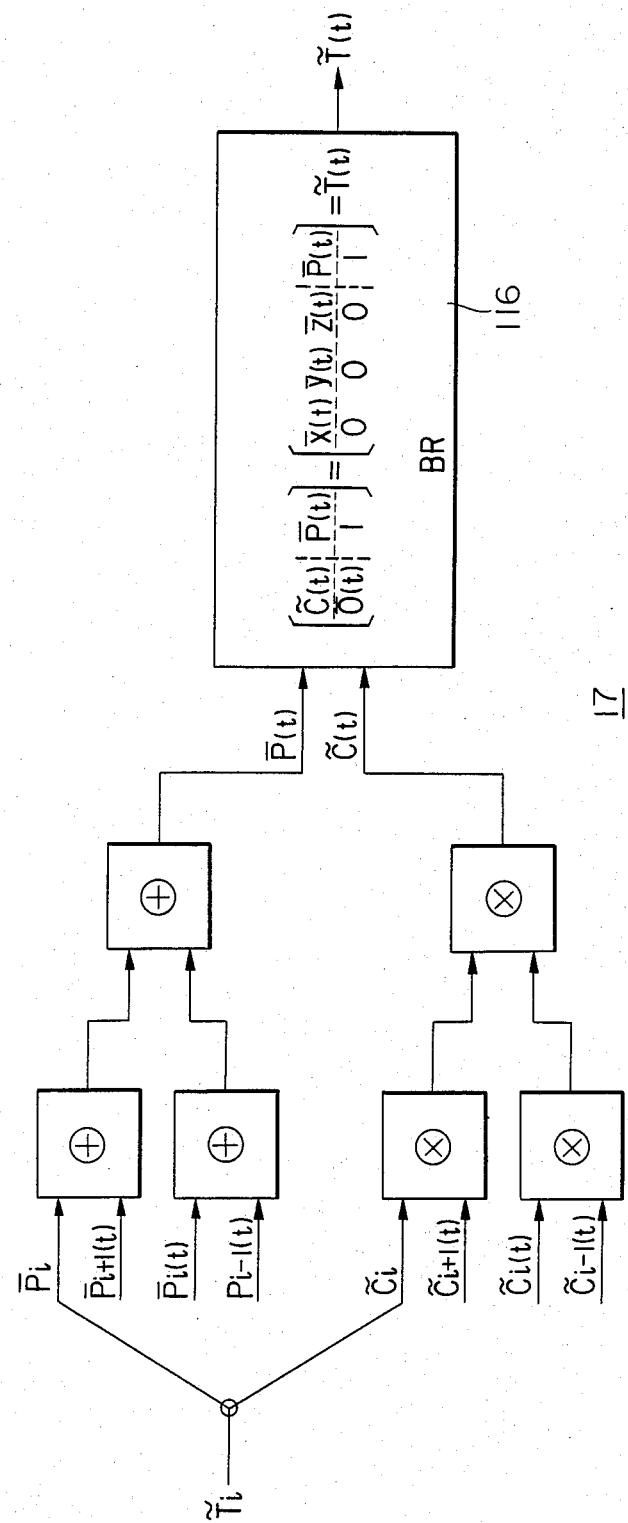

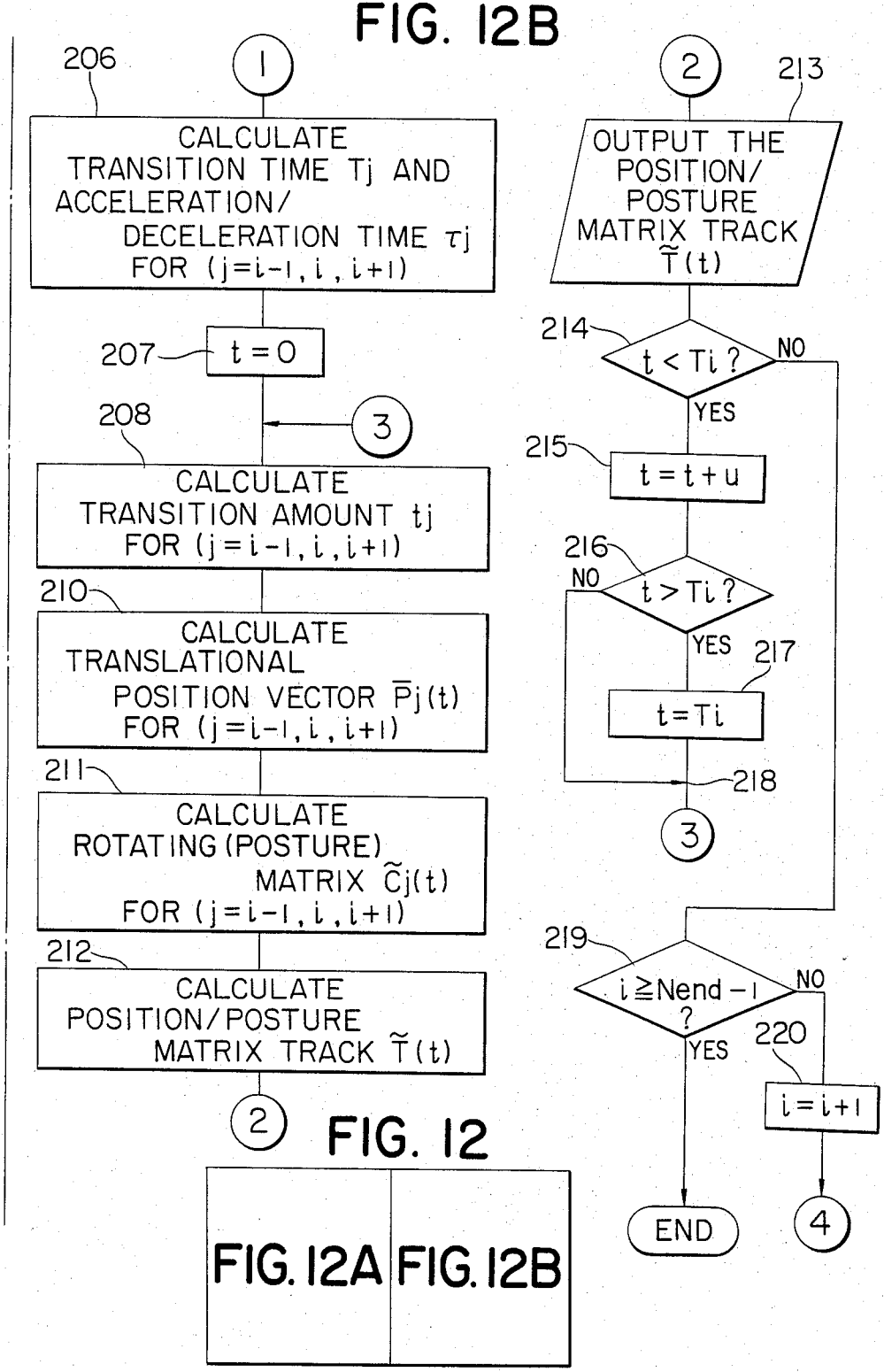

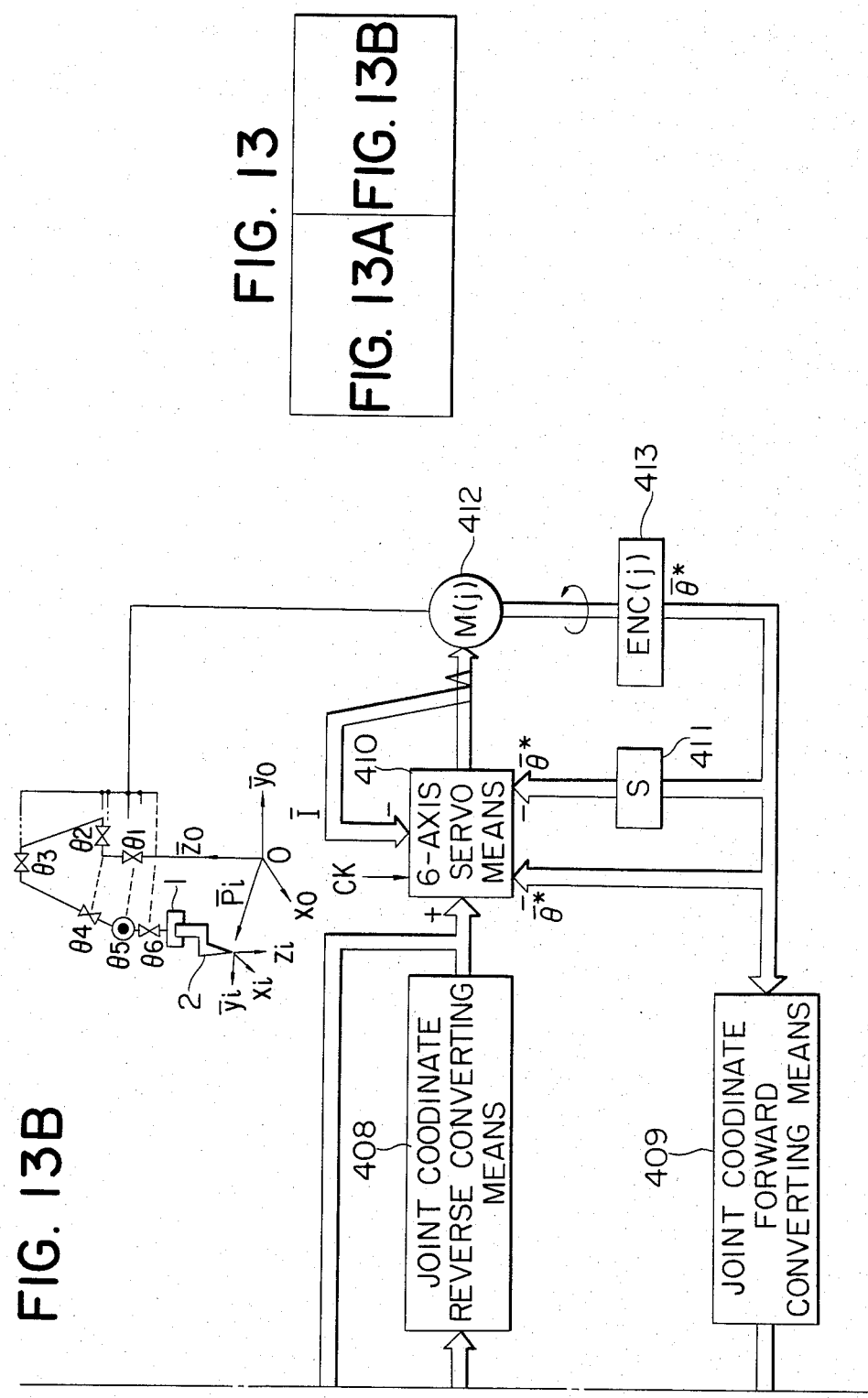

TRACKING CONTROL SYSTEM OF MULTIJOINT ROBOT

BACKGROUND OF THE INVENTION

I. Field of the Invention

The present invention relates to a tracking control system of a multijoint robot which performs tracking control of an end of a tool attached to a hand of a robot arm and, more particularly, to a real-time, high-speed trajectory generator of the tracking control system.

II. Description of the Prior Art

In general, when a multilink mechanism such as a multijoint robot which provides free movement is simultaneously subjected to linear movement which involves translational motion and rotational movement which involves a change in posture, and when a velocity pattern of the translational motion or movement (to be simply referred to as a translational velocity pattern hereinafter) is given, the rotational velocity pattern is uniquely determined since the translational velocity determines the rotational velocity. This often leads to a disadvantage in that the rotational velocity pattern is too great to allow tracking of the servo system for controlling parameters of the individual joints between adjacent unit arms. Furthermore, even if a rotational velocity pattern is properly given, the translational velocity pattern is often excessively increased, resulting in a great problem in servo control.

SUMMARY OF THE INVENTION

In order to overcome the conventional problem described above, it is, therefore, an object of the present invention to provide a tracking control system of a multijoint robot, wherein a change in posture of an end of a tool attached to the hand of the robot is defined as rotation thereof about a rotational main axis, a velocity pattern is given to a helical trajectory obtained by synthesizing an arc traced by an imaginary point which is in a plane perpendicular to the rotational main axis and is spaced a predetermined distance apart from the rotational main axis upon rotation of the robot arm and a straight line obtained by a translational motion of the tool attached to the hand of the robot arm so as to calculate as components of the velocity pattern a translational velocity pattern and a rotational velocity pattern, thereby generating target position data and posture tracking data so as to perform smooth servo tracking for controlling individual joint parameters.

It is another object of the present invention to provide a tracking control system of a multijoint robot, wherein a velocity pattern given on an imaginary point is automatically given as a translational velocity pattern when the robot is subjected to only a translational motion or movement, and a value obtained by dividing the velocity pattern given on the imaginary point by a distance between a rotational main axis and the imaginary point is given as a rotational velocity pattern when the robot is subjected to only a rotational movement.

It is still another object of the present invention to provide a tracking control system of a multijoint robot, wherein a distance between the rotational main axis and the imaginary point is suitably set as a parameter such that a predetermined translational velocity is held between two teaching points during which a change in posture does not occur and the translational velocity is smoothly decreased between two teaching points during which a change in posture is great, thereby generating a trajectory suitable for assembly operation and decreasing the assembly time.

In order to achieve the above objects of the present invention, there is provided a tracking control system of a multijoint robot, comprising: means for setting as tracking data a velocity V and an acceleration/deceleration velocity $\alpha$ on a helical trajectory obtained by synthesizing an arc traced upon rotation of the tool by an imaginary point which is in a plane perpendicular to the rotational main axis of a tool attached to the hand of the multijoint arm and is spaced by a predetermined distance $r_h$ from the rotational main axis and a straight line obtained by a translational motion of the tool attached to the hand of the arm; means for calculating a translational velocity pattern and a rotational velocity pattern as components of a velocity pattern determined in accordance with the velocity V and the acceleration/deceleration velocity $\alpha$ on the helical trajectory; and means for generating a position/posture matrix signal for causing the multijoint robot to rotate about the rotational main axis and translate in accordance with the rotational velocity pattern and the translational velocity pattern.

The above and other objects, advantages and features of this invention will become apparent from the following description of the foregoing and other embodiments thereof presented in conjunction with the accompanying drawings.

BRIEF DESCRIPTION OF THE DRAWINGS

FIGS. 4, 4A and 4B are block diagrams of a trajectory generator according to an embodiment of the present invention;

FIG. 5 shows basic arithmetic operation circuits as operation blocks constituting the trajectory generator shown in FIG. 4;

FIGS. 6, 6A and 6B are circuit diagrams of a transition variable calculator of the trajectory generator shown in FIG. 4;

FIGS. 8, 8A and 8B are circuit diagrams of a transition distance multiplier of the trajectory generator shown in FIG. 4;

FIG. 9 is a circuit diagram of a translational position vector calculator of the trajectory generator shown in FIG. 4;

FIG. 11 is a circuit diagram of a position/posture matrix calculator of the trajectory generator shown in FIG. 4;

FIGS. 12, 12A and 12B are flow charts for explaining part of the operation of the trajectory generator by using computer software; and FIGS. 13, 13A and 13B are block diagrams of a trajectory control system when the trajectory generator shown in FIG. 4 is applied to a multijoint robot.

DETAILED DESCRIPTION OF THE PREFERRED EMBODIMENT

Figure 1A:
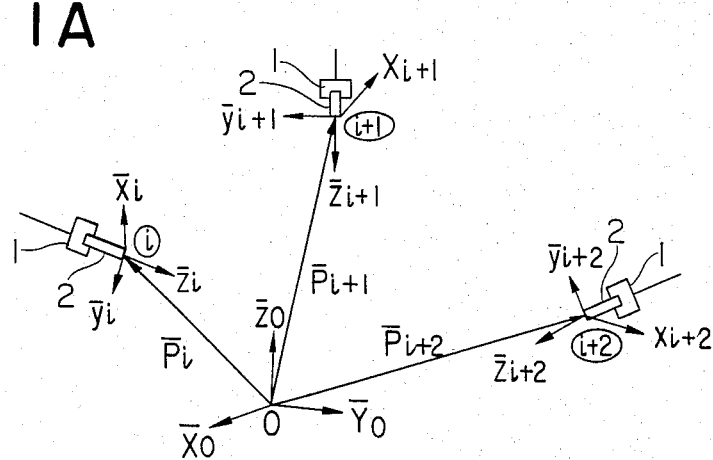
FIG. 1A is a representation for explaining the position vectors and the posture matrices at teaching points i, i+1 and i+2 of an end of a tool attached to the hand of the robot arm in accordance with a system of coordinates having axes $\overline{X}_0$, $\overline{Y}_0$ and $\overline{Z}_0$ of the robot to be controlled.

The basic principle of the present invention will be described with reference to FIGS. 1 to 3. FIG. 1A shows position vectors $\bar{P}_i$, and $\bar{P}_{i+1}$, and $\bar{P}_{i+2}$ and posture matrices $(\bar{x}_i, \bar{y}_i, \bar{z}_i)$, $(\bar{x}_{i+1}, \bar{y}_{i+1}, \bar{z}_{i+1})$ and $(\bar{x}_{i+2}, \bar{y}_{i+2}, \bar{z}_{i+2})$ at teaching points i, i+1 and i+2 of an end of a tool 2 attached to a hand 1 of a robot when these teaching points are measured from the origin of the robot along axes $X_0$, $Y_0$ and $Z_0$. The position vector and the posture matrix are stored as teaching data in a memory. In this case, the matrix data format is given as follows:

$$\tilde{T}_i = \begin{pmatrix} \bar{x}_i, \bar{y}_i, \bar{z}_i & \bar{P}_i \\ 0, 0, 0, & 1 \end{pmatrix} = \begin{pmatrix} \tilde{C}_i, & \bar{P}_i \\ \bar{0}', & 1 \end{pmatrix}$$

$$\tilde{T}_{i+1} = \begin{pmatrix} \bar{x}_{i+1}, \bar{y}_{i+1}, \bar{z}_{i+1} & \bar{P}_{i+1} \\ 0, 0, 0 & 1 \end{pmatrix} = \begin{pmatrix} \tilde{C}_{i+1}, & \bar{P}_{i+1} \\ \bar{0}', & 1 \end{pmatrix}$$

$$\tilde{T}_{i+2} = \begin{pmatrix} \bar{x}_{i+2}, \bar{y}_{i+2}, \bar{z}_{i+2} & \bar{P}_{i+2} \\ 0, 0, 0 & 1 \end{pmatrix} = \begin{pmatrix} \tilde{C}_{i+2}, & \bar{P}_{i+2} \\ \bar{0}', & 1 \end{pmatrix}$$

where $\bar{z}_i$, $\bar{z}_{i+1}$ and $\bar{z}_{i+2}$ represent approach directions of the finger end at the teaching positions i, i+1, i+2, and $\bar{y}_i$, $\bar{y}_{i+1}$ and $\bar{y}_{i+2}$ represent orientation directions of the finger end thereat; and $\bar{x}_i$, $\bar{x}_{i+1}$ and $\bar{x}_{i+2}$ represent perpendicular directions to the arm and finger directions, respectively, so that sets of these directions are given as posture matrices $C_i$, $C_{i+1}$ and $C_{i+2}$, respectively.

Figure 1B:
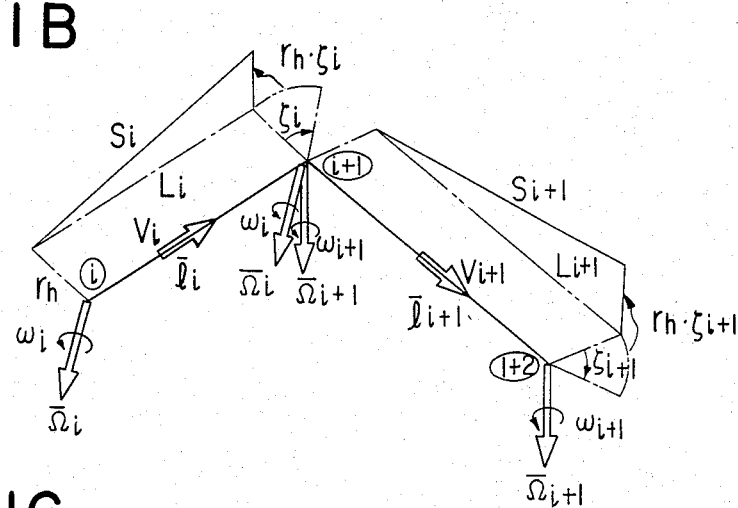
FIG. 1B is a representation for explaining the translational motion vectors, the translational velocities, the rotational main axis vectors, and the rotational velocities about the rotational main axis between the teaching points i and i+1 and between the teaching points i+1 and i+2.

FIG. 1B shows translational motion vectors $\bar{l}_i$ and $\bar{l}_{i+1}$ between the teaching points i and i+1 and between the teaching points i+1 and i+2 obtained from the position/posture matrix data $T_i$, $T_{i+1}$ and $T_{i+2}$ of the teaching points i, i+1 and i+2, translational velocities $v_i$ and $v_{i+1}$ along these directions, rotational main axis vectors $\Omega_i$ and $\Omega_{i+1}$, and rotational velocities $\omega_i$ and $\omega_{i+1}$ about vectors. Furthermore, FIG. 1B shows translational distances $L_i$ and $L_{i+1}$ obtained by the translational motion along the translational motion vectors $\bar{l}_i$ and $\bar{l}_{i+1}$ at the translational velocities $v_i$ and $v_{i+1}$ between the teaching points i and i+1 and between the teaching points i+1 and i+2, respectively; rotational angles $\xi_i$ and $\xi_{i+1}$ obtained by rotational movement about the rotational main axis vectors $\Omega_i$ and $\Omega_{i+1}$ at the rotational velocities $\omega_i$ and $\omega_{i+1}$, respectively; and transition distances $S_i$ and $S_{i+1}$ obtained by synthesizing vectors such that the vectors of arcs $r_h \cdot \xi_i$ and $r_h \cdot \xi_{i+1}$ obtained by tracing the imaginary point which is in a plane perpendicular to the rotational main axis vectors $\Omega_i$ and $\Omega_{i+1}$ and is spaced apart by the distance $r_h$ are synthesized with vectors of lengths of trajectories traced upon translational motion of the tool end and upon rotation about the rotational main axis (vectors), respectively.

Figures 2A, 2B, 2C:
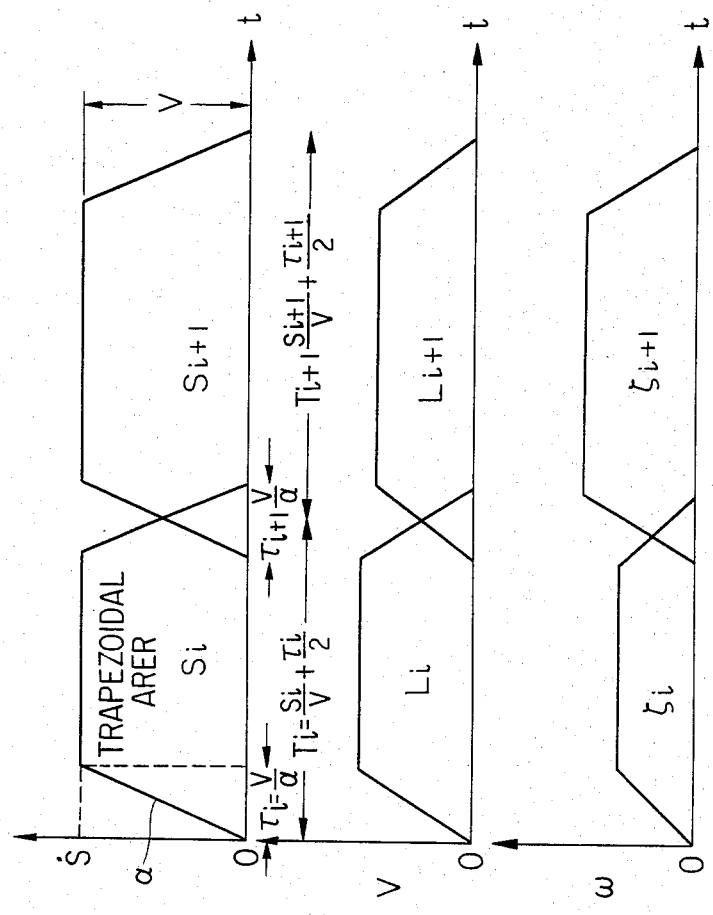
FIG. 2A is a graph showing the trapezoidal velocity pattern S of the imaginary point when transition distance is greater than $V^2/\alpha$.
FIGS. 2B and 2C are respectively graphs showing the translational velocity pattern and the rotational velocity pattern which are obtained as vector components of the trapezoidal velocity pattern S.

FIG. 2A shows the trapezoidal velocity pattern S of the imaginary point in accordance with the velocity V and the acceleration/deceleration velocity $\alpha$ which are specified with respect to the imaginary point when the transition distances $S_i$ and $S_{i+1}$ are greater than $V^2/\alpha$. FIGS. 2B and 2C respectively show the translational velocity pattern v and the rotational velocity pattern $\omega$ which are obtained from the trapezoidal velocity pattern S of the imaginary point. Symbols $\tau_i$ and $\tau_{i+1}$ denote acceleration/deceleration times, and $T_i$ and $T_{i+1}$, transition times, between the teaching points i and i+1 and between the teaching points i+1 and i+2, respectively. Reference symbols $S_i$, $S_{i+1}$, $L_i$, $L_{i+1}$, $\xi_i$ and $\xi_{i+1}$ denote areas of the trapezoids, respectively.

Figures 3A, 3B, 3C:
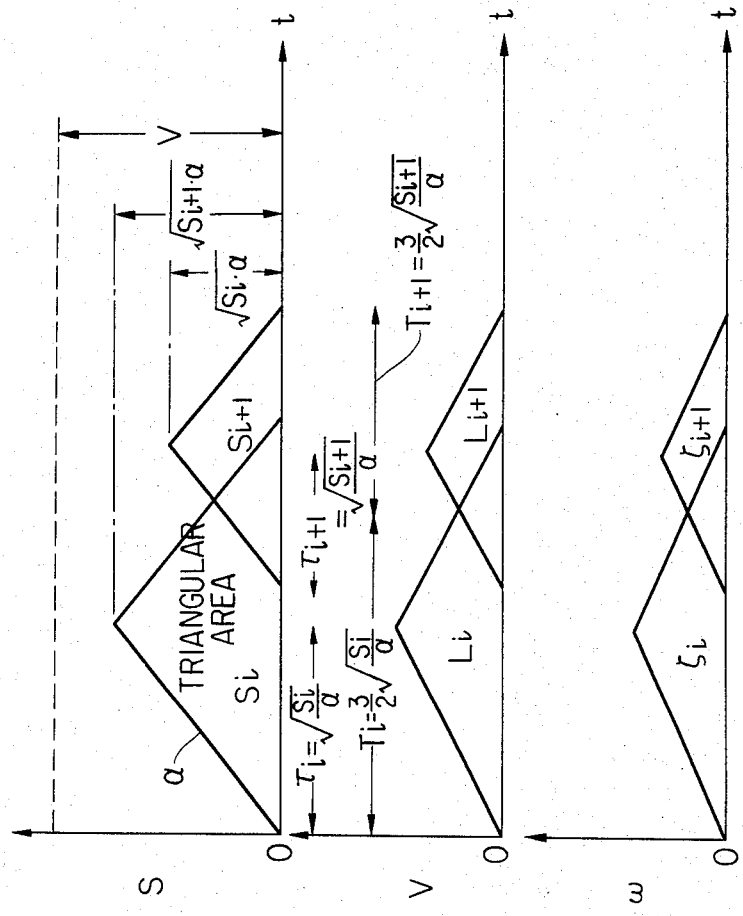
FIGS. 3A, 3B and 3C are graphs respectively showing the triangular velocity pattern, the translational velocity pattern and the rotational velocity pattern of the imaginary point, respectively, when the respective transition distance is shorter than $V^2/\alpha$.

FIG. 3A shows a triangular velocity pattern S of the imaginary point in accordance with the velocity v and the acceleration/deceleration velocity $\alpha$ which are specified with respect to the imaginary point, when the transition distances $S_i$ and $S_{i+1}$ are shorter than $V^2/\alpha$. In this case, the maximum velocity is not given as V, but as $\sqrt{S_i \cdot \alpha}$ and $\sqrt{S_{i+1} \cdot \alpha}$. The same pattern is obtained as in FIGS. 2A to 2C, except that the transition distances are different, so that a detailed description with reference to FIG. 3A will be omitted.

Figure 1C:
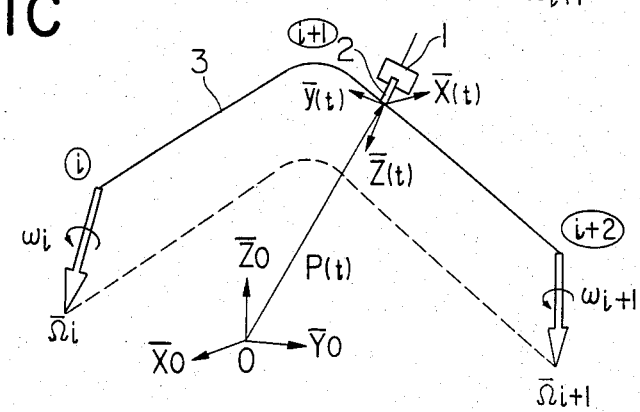
FIG. 1C is a representation illustrating a trajectory of the position vector when the end of the tool attached to the hand translates along the translational motion vector in FIG. 1B and also illustrating the envelope of the rotational main axis vector shown in FIG. 1B.

FIG. 1C shows a trajectory 3 of the position vector $\bar{P}(t)$ when the end of the tool 2 attached to the hand 1 translates along the translational motion vectors $\bar{l}_i$ and $\bar{l}_{i+1}$ of FIG. 1B in accordance with the velocity pattern shown in FIG. 2B or 3B. The trajectory 3 is given as an elliptical arc inscribing a line connecting teaching points i and i+1 and another line connecting teaching points i+1 and i+2 in the vicinity of the point i+1. At the same time, FIG. 1C shows an envelope 4 traced by the top of the rotational main axis vector and the posture matrices $\bar{x}(t)$, $\bar{y}(t)$ and $\bar{z}(t)$ of the end of the tool 2 when the end of the tool 2 rotates about the rotational main vectors $\Omega_i$ and $\Omega_{i+1}$ (FIG. 1B) in accordance with the velocity pattern shown in FIG. 2C or 3C. The position vector $\bar{P}(t)$ and the posture matrices $\bar{x}(t)$, $\bar{y}(t)$ and $\bar{z}(t)$ are given as a position/posture matrix T(t):

The position/posture matrix T(t) is given as follows:

$$\tilde{T}(t) = \begin{pmatrix} \overline{x(t), y(t), z(t)}, & \overline{P}(t) \\ 0, \quad 0, \quad 0, & 1 \end{pmatrix} = \begin{pmatrix} \tilde{C}(t) & \overline{P}(t) \\ \overline{0}' & 1 \end{pmatrix}$$

Input signals to the trajectory generator of the present invention comprise position/posture matrix data $T_i$, $T_{i+1}$ and $T_{i+2}$ stored in the memory. Output signals from the trajectory generator are position/posture matrix data T(t). Referring to FIG. 1B and FIGS. 2A to 2C or FIGS. 3A to 3C, when the translational distances $L_i$ and $L_{i+1}$ are extremely short and the rotational angles $\xi_i$ and $\xi_{i+1}$ are large, the velocity pattern v of the end of the tool 2 is not set but the velocity pattern S on the imaginary point is, so that spreading of the rotational velocity pattern $\omega$ due to spontaneity of the translational motion and the rotational movement can be properly prevented. The spreading of the translational velocity pattern v upon setting of the rotational velocity pattern $\omega$ can be prevented by setting the velocity pattern S on the imaginary point when rotational angles $\xi_i$ and $\xi_{i+1}$ are small and translational distances $L_i$ and $L_{i+1}$ are long.

The position/posture matrix data T(t) generated from the trajectory generator are used to automatically control the translational velocity pattern and the rotational velocity pattern even if the posture of the multijoint robot greatly changes, thereby preventing an abrupt change in the target value of the robot servo.

The trajectory generator according to an embodiment of the present invention will be described in detail with reference to the accompanying drawings.

Figure 4A:
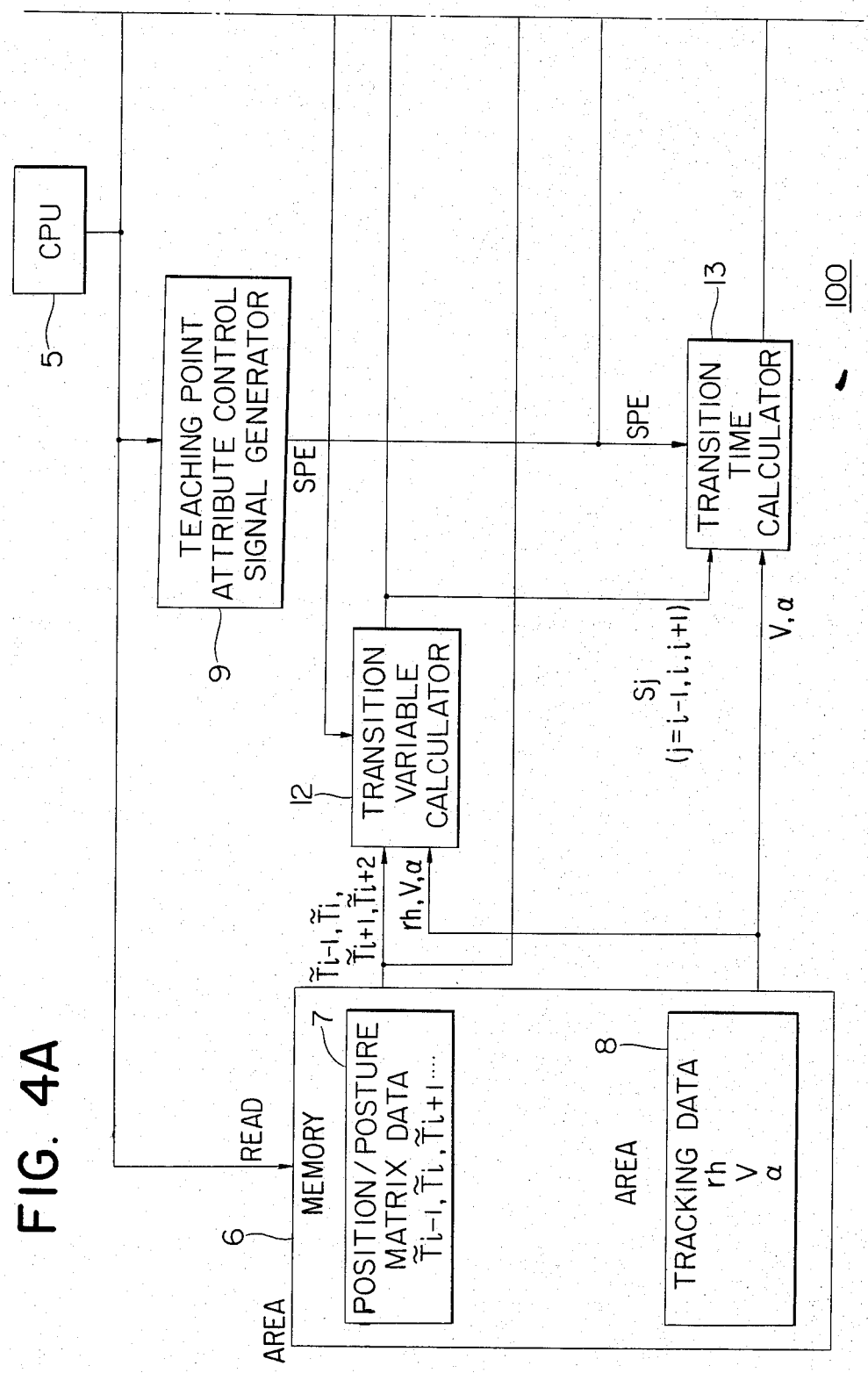

FIG. 4 shows an overall block 100 of the trajectory generator.

A CPU 5 controls the trajectory generator. A memory 6 has an area 7 for storing position/posture matrix data $T_{i-1}$, $T_i$ and $T_{i+1}$ at teaching points i−1, i, and i+1, respectively, and an area 8 for storing tracking data such as a distance $r_h$ between the rotational main axis and the imaginary point, and a velocity V and an acceleration/deceleration velocity $\alpha$ which are specified on the imaginary point. In order to generate a trajectory between the teaching points i and i+1, the position/posture matrix data $T_{i-1}$, $T_i$, $T_{i+1}$ and $T_{i+2}$, and tracking data $r_h$, V, and $\alpha$ are read out from the memory 6 in response to a read control signal READ from the CPU 5. The readout data are then supplied to a transition variable calculator 12. A teaching point selection signal generator 10 generates a teaching point selection signal TPS for selecting a calculation interval in accordance with the control signal generated from the CPU 5. The transition variable calculator 12 calculates and generates transition distance signals $S_j$ (j=i−1, i, i+1) of the imaginary point, translational velocity signals $V_j$ (j=i−1, i, i+1), translational vector signals $\bar{l}_j$ (j=i−1, i, i+1), rotational velocity signals $\omega_j$ (j=i−1, i, i+1) and rotational main axis vector signals $\bar{\Omega}_j$ (j=i−1, i, i+1) between the teaching points i−1 and i and between the teaching points i and i+1, respectively.

In response to the control signal from the CPU 5, a teaching point attribute control signal generator 9 generates a teaching point attribute control signal SPE which represents that the teaching point matches a start point, a passing point, or an end point. A transition time calculator 13 receives the transition distance signal $S_j$ (j=i−1, i and i+1), the velocity signal V and the acceleration/deceleration signal $\alpha$, which latter two are specified on the imaginary point, and calculates and generates the teaching point interval/transition time signal $T_j$ (j=i−1, i, i+1) and the acceleration/deceleration time signal $\tau_j$ (j=i−1, i, i+1) which correspond to a start point, passing point or end point by the teaching point attribute control signal SPE.

A transition amount multiplier 14 receives a time signal t generated by a counter 11 for counting clock pulses CK from the CPU 5. The multiplier 14 also receives the signal $T_j$ (j=i−1, i, i+1) and the signal $\tau_j$ (j=i−1, i, i+1). The multiplier 14 generates a transition amount signal $t_j$ (j=i−1, i, i+1) (i.e., an integrated value of the velocity pattern at time t) under the control of the signal SPE. The signal $t_j$ (j=i−1, i, i+1) represents an amount corresponding to a trapezoidal area in the velocity pattern (FIGS. 2A to 2C) when the height of the trapezoid is given as 1.

Following the above calculation, a translational position vector calculator 15 and a rotational (posture) matrix calculator 16 perform parallel operation. The translational position vector calculator 15 receives the translational velocity signal $V_j$ (j=i−1, i, i+1), the translational vector signal $\bar{l}_j$ (j=i−1, i, i+1) and the transition amount signal $t_j$ (j=i−1, i, i+1), and generates the translational position vector signal $\bar{P}_j(t)$ (j=i−1, i, i+1) at time t.

The rotational (posture) matrix calculator 16 receives the rotational velocity signal $\omega_j$ (j=i−1, i, i+1), the rotational main axis vector signal $\bar{\Omega}_j$ (j=i−1, i, i+1), and the transition amount signal $t_j$ (j=i−1, i, i+1), and generates the rotational (posture) matrix signal $C_j(t)$ (j=i−1, i, i+1) at time t.

Finally, a position/posture matrix trajectory calculator 17 produces a vector sum for a position component and a matrix product for a posture component in accordance with the position/posture matrix data $T_i$ at the teaching point i, the translational position vector signal $\bar{P}_j(t)$ (j=i−1, i, i+1) at the time t, and the rotational (posture) matrix signal $C_j(t)$ (j=i−1, i, i+1) at the time t. The calculator 17 thus generates the position/posture matrix trajectory T(t) at the time t. Thus, a cycle including a series of operations for an interval between the teaching points i and i+1 is completed by the trajectory generator 100. The next trajectory between the teaching points i+1 and i+2 is generated by reading out the data stored in the position/posture matrix data area 7 of the memory 6 in response to the control signal READ generated from the CPU 5 after the address pointer of the matrix data in the area 7 is incremented by one. The subsequent operation is the same as that described above, and a detailed description thereof will be omitted. The operation cycle is repeated until the teaching point attribute control signal generator 9 generates the signal SPE which represents the end point.

The individual calculator blocks of the trajectory generator 100 shown in FIG. 4 will be described in detail below.

FIG. 5 shows representations of basic calculators constituting the calculator blocks. The basic calculators include a scalar adder 101, a scalar subtracter 102, a scalar multiplier 103, a scalar divider 104, a square root circuit 105, a cosine circuit 106, an arccosine circuit 107, a vector adder 108, a vector subtracter 109, an inner product circuit 110, a vector product circuit 111, a vector absolute value circuit 112, a unit vector circuit 113, a vector parameter multiplier 114, a 3×3 matrix product circuit 115, a 4×4 position/posture matrix buffer register circuit 116, and so on.

Figure 6A:
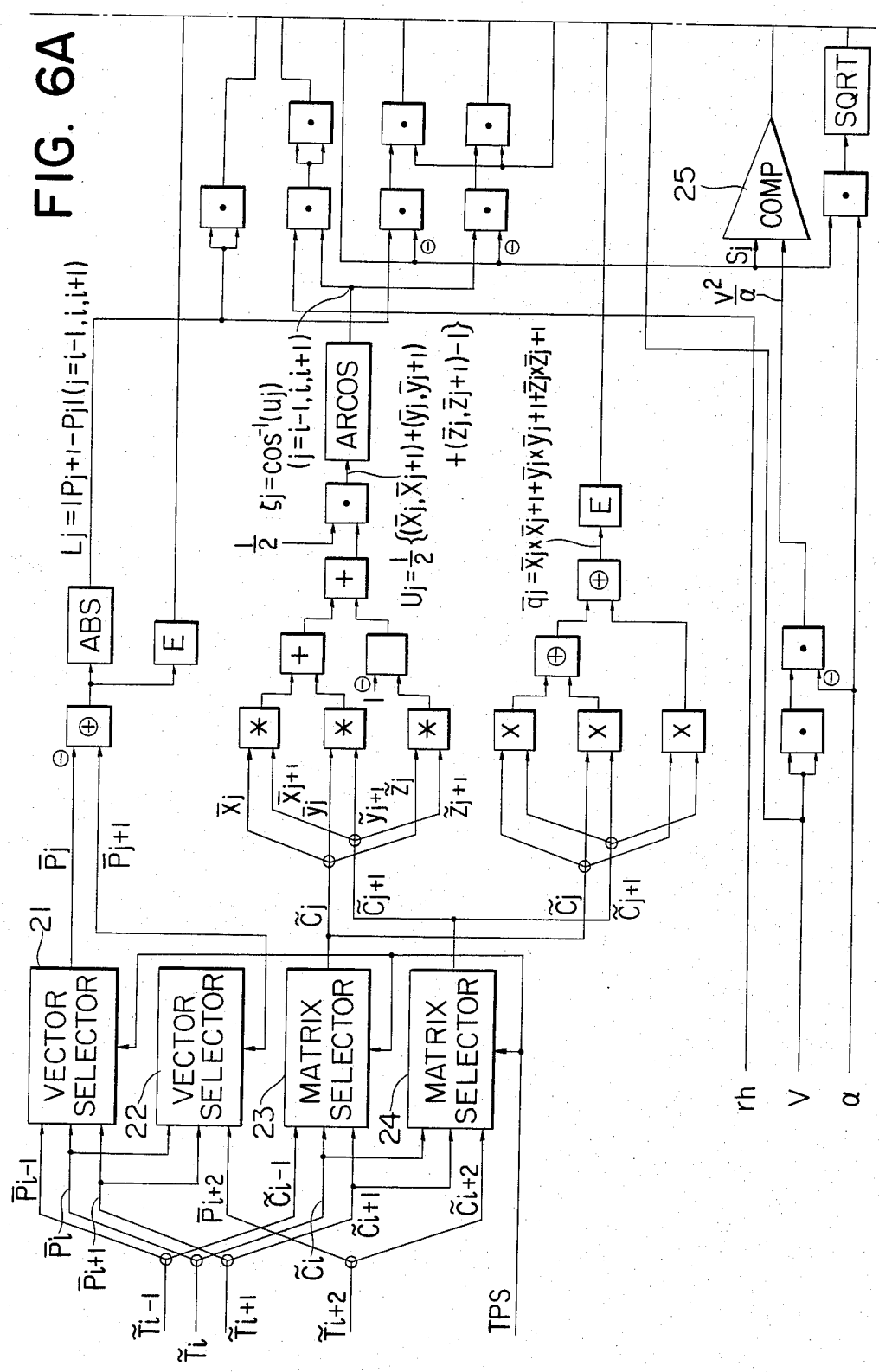

FIG. 6 shows detailed hardware of the transition variable calculator 12. The calculator 12 comprises vector selectors 21 and 22, matrix selectors 23 and 24, a scalar selector 26 and a comparator 25. In addition to these components, the calculator 12 also includes basic calculators 101, 102, 103, 104, 105, 106, 107, 108, 109, 110, 111, 112 and 113, as shown in FIG. 5. The position vector component signals $\overline{P}_{i-1}$, $\overline{P}_i$, $\overline{P}_{i+1}$ and $\overline{P}_{i+2}$ of the position/posture matrix signal data $T_{i-1}$, $T_i$, $T_{i+1}$ and $T_{i+2}$ respectively corresponding to the teaching points $i-1$, $i$, $i+1$ and $i+2$ and read out from the memory 6 are supplied to the vector selectors 21 and 22, and the posture matrix component signals $C_{i-1}$, $C_i$, $C_{i+1}$ and $C_{i+2}$ thereof are supplied to the matrix selectors 23 and 24. A pair of position vector component signals $\overline{P}_j$ and $\overline{P}_{j+1}$ and a pair of posture matrix component signals $C_j$ and $C_{j+1}$ are selected in response to the signal TPS for selecting an interval of the teaching point data.

The translational distance signal $L_j = |\overline{P}_{j+1} - \overline{P}_j|$ ($j = i-1$, $i$, $i+1$) and the translational vector signal $\overline{l}_j = (\overline{P}_{j+1} - \overline{P}_j)/L_j$ ($j = i-1$, $i$, $i+1$) are calculated in accordance with the pair of position vector component signals $\overline{P}_j$ and $\overline{P}_{j+1}$.

The rotational angle signal $\xi_j = \cos^{-1}(u_j)$ ($j = i-1$, $i$, $i+1$) and the rotational main axis vector signal $\Omega_j = \overline{q}_j/|q_j|$ ($j = i-1$, $i$, $i+1$) are calculated in accordance with the pair of posture matrix component signals $C_j$ and $C_{j+1}$, where $u_j$ is $(\frac{1}{2})\{(\overline{x}_j \overline{x}_{j+1}) + (\overline{y}_j \overline{y}_{j+1}) + (\overline{z}_j \overline{z}_{j+1}) - 1\}$ and $\overline{q}_j$ is $\overline{x}_j \times \overline{x}_{j+1} + \overline{y}_j \times \overline{y}_{j+1} + \overline{z}_j \times \overline{z}_{j+1}$.

The transition (translational motion and rotational movement) distance signal $S_j = \sqrt{L_j^2 + (r_h \xi_j)^2}$ ($j = i-1$, $i$, $i+1$) is calculated in accordance with the translational distance signal $L_j$ ($j = i-1$, $i$, $i+1$), the rotational angle signal $\xi_j$ ($j = i-1$, $i$, $i+1$) and the distance $r_h$ between the rotational main axis and the imaginary point.

This transition distance signal $S_j$ is compared by a comparator 25 with a ratio $V^2/\alpha$ of a squared velocity signal $V^2$ to the acceleration/deceleration velocity signal $\alpha$. The comparator 25 generates an output signal LAS. The signal LAS represents that the velocity pattern is given as trapezoidal patterns (FIGS. 2A to 2C) or triangular patterns (FIGS. 3A to 3C) and is used to control the scalar selector 26.

The scalar selector 26 receives the velocity signal V and a signal $\sqrt{\alpha \cdot S_j}$ calculated from the acceleration/deceleration signal $\alpha$ and the transition distance signal $S_j$ and generates a velocity signal $S_j$ ($j = i-1$, $i$, $i+1$) on the imaginary point. The signal $S_j$ is multiplied with a ratio of the translational distance signal $L_j$ ($j = i-1$, $i$, $i+1$) to the transition distance signal $S_j$ ($j = i-1$, $i$, $i+1$) so as to obtain the translational velocity signal $V_j$ ($j = i-1$, $i$, $i+1$) as a velocity component. At the same time, the signal $S_j$ is multiplied with a ratio of the rotational angle signal $\xi_j$ ($j = i-1$, $i$, $i+1$) to the transition distance signal $S_j$ ($j = i-1$, $i$, $i+1$) so as to obtain the rotational velocity signal $\omega_j$ ($j = i-1$, $i$, $i+1$) as a velocity component. In other words, $V_j = (L_j/S_j) \cdot S_j$ and $\omega_j = (\xi_j/S_j) \cdot S_j$ are calculated.

Finally, the transition variable calculator 12 generate the translational vector signal $\overline{l}_j$ ($j = i-1$, $i$, $i+1$), the transition distance signal $S_j$ ($j = i-1$, $i$, $i+1$), the translational velocity signal $V_j$ ($j = i-1$, $i$, $i+1$), the rotational velocity signal $\omega_j$ ($j = i-1$, $i$, $i+1$), and the rotational main axis vector signal $\Omega_j$ ($j = i-1$, $i$, $i+1$).

Figure 7:
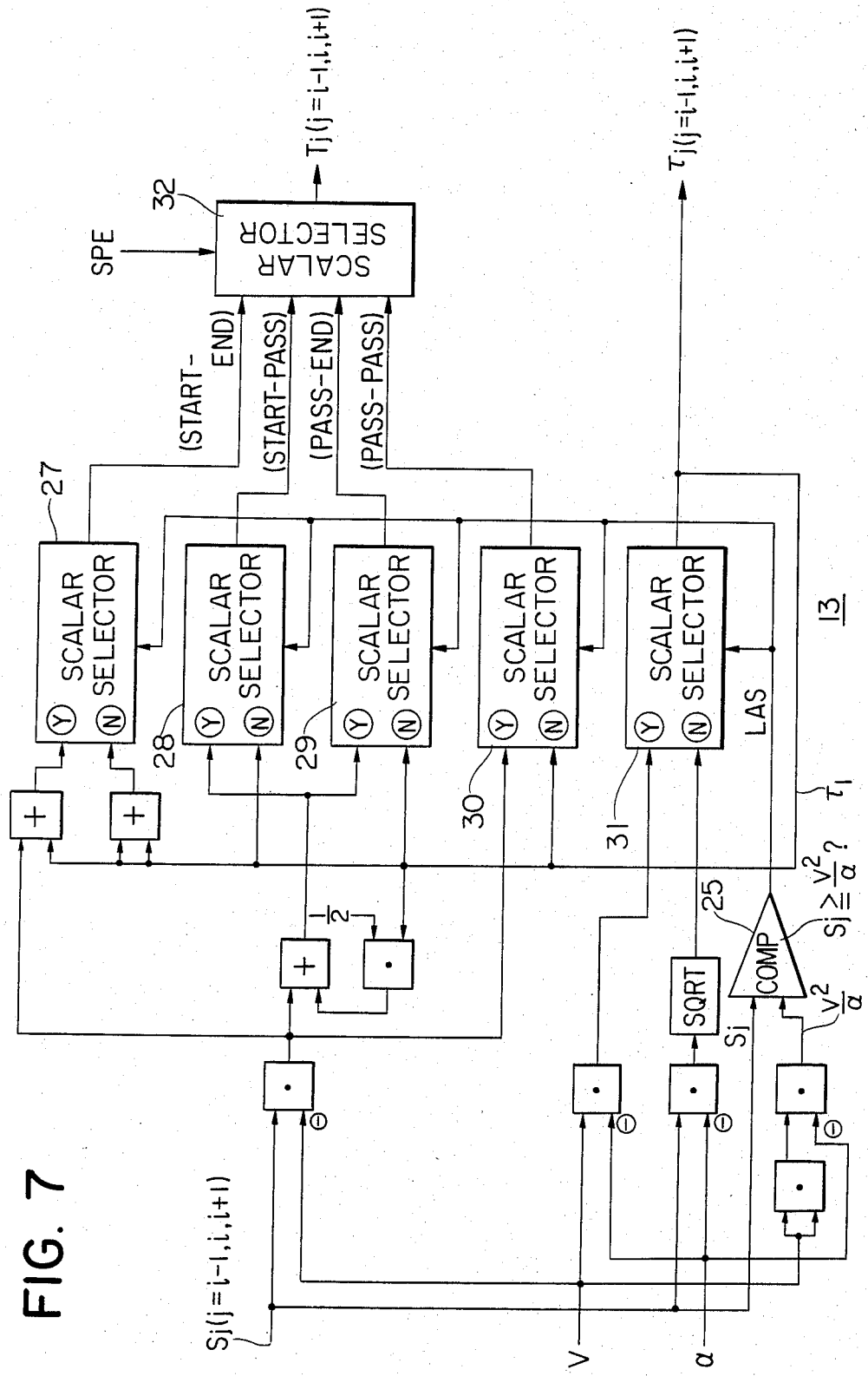
FIG. 7 is a circuit diagram of a transition time calculator of the trajectory generator shown in FIG. 4.

FIG. 7 shows detailed hardware of a transition time calculator 13. This calculator comprises scalar selectors 27, 28, 29, 30, 31 and 32 and a comparator 25. In addition to these components, the calculator 13 also comprises the basic calculators 101, 103, 104 and 105 shown in FIG. 5. The calculator 13 receives the transition distance signal $S_j$ ($j = i-1$, $i$, $i+1$), the velocity signal V, and the acceleration/deceleration velocity signal $\alpha$, and calculates the transition time signal $T_j$ ($j = i-1$, $i$, $i+1$) and the acceleration/deceleration time signal $\tau_j$ ($j = i-1$, $i$, $i+1$) for each teaching point interval.

The comparator 25 generates a signal LAS for controlling the switching operation of the scalar selectors so as to correspond to the trapezoidal patterns (FIGS. 2A to 2C) or the triangular patterns (FIGS. 3A to 3C) in accordance with the transition distance signal $S_j$ ($j = i-1$, $i$, $i+1$) and the ratio of the squared velocity signal $V^2$ to the acceleration/deceleration velocity signal $\alpha$. The scalar selector 31 selects the acceleration/deceleration time signal $\tau_j$ ($j = i-1$, $i$, $i+1$) in accordance with this control signal LAS. The scalar selector 27 selects the transition time signal when the teaching points are given as start and end points, respectively. The scalar selector 28 selects the transition time signal when the teaching points are given as start and passing points, respectively. The scalar selector 29 selects the transition time signal when the teaching points are given as passing and end points, respectively. Furthermore, the scalar selector 30 selects the transition time signal when the teaching points are given as passing points, respectively. These transition time signals are supplied to the scalar selector 32.

The scalar selector 32 performs selection control in accordance with the control signal SPE which represents whether the teaching point is the start point, the passing point or the end point and which is obtained as an output from the teaching point attribute control signal generator 9. Finally, one of the four transition time signals is selected, and the teaching point transition time signal $T_j$ ($j = i-1$, $i$, $i+1$) is generated from the scalar selector 32.

Figure 8A:
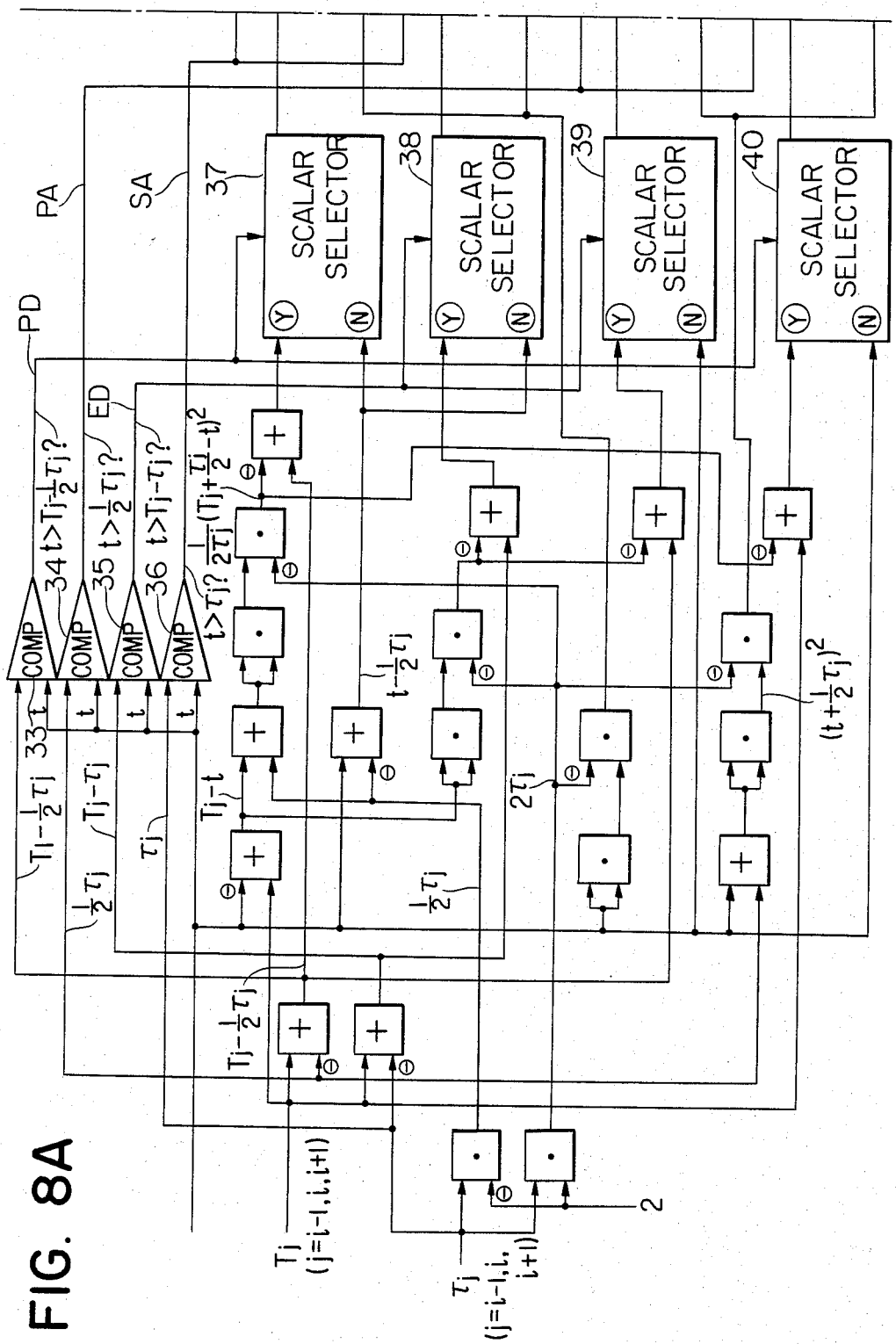

FIG. 8 shows detailed hardware of the transition amount multiplier 14. The multiplier 14 comprises scalar selectors 37, 38, 39, 40, 41, 42, 43, 44 and 45 and comparators 33, 34, 35 and 36, and also includes the basic calculators 101, 102, 103 and 104 shown in FIG. 5. This multiplier 14 receives the teaching point transition time signal $T_j$ ($j = i-1$, $i$, $i+1$), the acceleration/deceleration time signal $\tau_j$ ($j = i-1$, $i$, $i+1$), and the time signal t as an output from the counter 11, and generates a transition amount signal $t_j$ ($j = i-1$, $i$, $i+1$) which represents a trapezoidal or triangular area counted up to the time t as if the maximum velocities of the velocity patterns as shown FIGS. 2A to 2C or FIGS. 3A to 3C is given as 1.

The comparator 33 generates a signal PD representing that the teaching point used in the present calculation is given as a passing point and the trajectory falls within an deceleration time interval of the velocity pattern. The comparator 34 generates a signal PA representing that the teaching point is given as a passing point and the trajectory falls within an acceleration time interval of the velocity pattern. The comparator 35 generates a signal ED representing that the teaching point is given as the end point and the trajectory falls within the deceleration time interval of the velocity pattern. The comparator 36 generates a signal SA representing that the teaching point is given as the start point and the trajectory falls within the acceleration time interval of the velocity pattern.

The scalar selectors 37 and 41 are controlled in response to the signals PD and SA, respectively, and select the transition amount signals between start and passing points. The scalar selectors 38 and 42 are controlled in response to the signals ED and SA, respectively, and select the transition amount signals between start and end points. The scalar selectors 39 and 43 are controlled in response to the signals ED and PA, respectively, and select the transition amount signals between passing and end points. Similarly, the scalar selectors 40 and 44 are controlled in response to the signals PD and PA, respectively, and select the transition amount signals between two passing points.

Finally, the scalar selector 45 selects one of the transition amount signals (between start and passing points, between start and end points, between passing and end points, and between two passing points) which is associated with the present trajectory generation. The scalar selector 45 then generates the transition amount signal $t_j$ (j=i−1, i, i+1) at the time t.

FIG. 9 shows detailed hardware of a translational position vector calculator 15. This calculator comprises the basic calculators 103 and 114 shown in FIG. 5. The calculator 15 multiplies the translational vector signal $\bar{l}_j$ (j=i−1, i, i+1), the translational velocity signal $V_j$ (j=i−1, i, i+1) as the velocity component, and the transition amount signal $t_j$ (j=i−1, i, i+1) at the time t, and generates the translational position vector signal $\bar{P}_j(t)$ (j=i−1, i, i+1).

Figure 10:
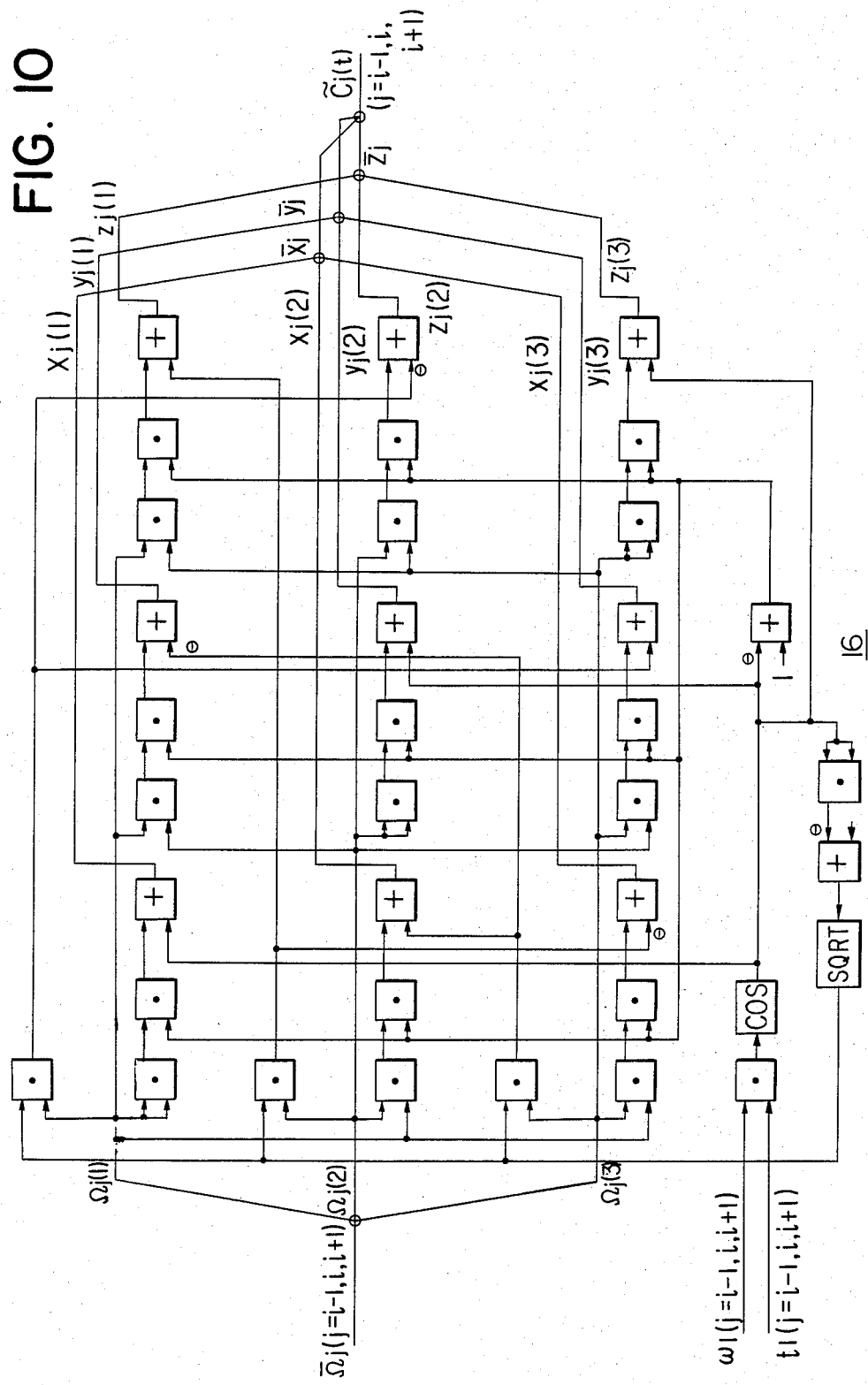
FIG. 10 is a circuit diagram of a rotational (posture) matrix calculator of the trajectory generator shown in FIG. 4.

FIG. 10 shows detailed hardware of a rotational (posture) matrix calculator 16. This calculator comprises the basic calculators 101, 102, 103, 105 and 106 shown in FIG. 5. This calculator 16 multiplies the rotational velocity signal $\omega_j$ (j=i−1, i, i+1) with the transition amount signal $t_j$ (j=i−1, i, i+1) at the time t, thereby obtaining the rotational angle data indicating rotation of the multijoint robot about the rotational main axis. The calculator 16 then calculates 3×3 matrix elements of the rotational matrix in accordance with the rotational angle data obtained above and the three components $\Omega_j(1)$, $\Omega_j(2)$ and $\Omega_j(3)$ of the rotational main axis vector signal $\Omega_j$ (j=i−1, i, i+1), and generates the rotational (posture) matrix signal $C_j(t)$ (j=i−1, i, i+1).

FIG. 11 shows detailed hardware of a position/posture matrix calculator 17. The calculator 17 comprises the basic calculators 108, 115 and 116 shown in FIG. 5. For the position vector component $\bar{P}_i$ of the position/posture matrix $T_i$ corresponding to the teaching point i, the translational position vector signals $\bar{P}_{i-1}(t)$, $\bar{P}_i(t)$ and $\bar{P}_{i+1}(t)$ are added, and a resultant sum is temporarily stored in a buffer register 116 as the position vector signal $\bar{P}(t)$ to the end of the tool 2 at the time t. For the posture matrix component $C_i$ of the position/posture matrix data $T_i$, the rotation (posture) matrix signals $C_{i-1}(t)$, $C_i(t)$ and $C_j(t)$ are multiplied, and a resultant product is temporarily stored as the posture matrix signal $C(t)$ to the end of the tool 2 at the time t in the buffer register 116. In other words, the buffer register 116 temporarily stores the signal components $\bar{P}(t)$, $\bar{x}(t)$, $\bar{y}(t)$ and $\bar{z}(t)$ shown in FIG. 1C. Finally, these signal components are arranged in a matrix format, and are generated as a position/posture matrix signal $T(t)$.

As shown in FIG. 11, the three translational position vector signals $\bar{P}_{i-1}(t)$, $\bar{P}_i(t)$ and $\bar{P}_{i+1}(t)$ are added. When the points i−1, i and i+1 are not aligned in line, vectors having opposing directions are synthesized within a predetermined period of time near the passing point i (i.e., between $T_i-\tau_i$ to $T_i+\tau_i$). As shown in FIG. 1C, the trajectory 3 of the end of the tool 2 becomes an inscribed elliptical arc within the time interval between $T_i-\tau_i$ and $T_i+\tau_i$ which has the passing point i as the center (the point i corresponds to the teaching point i+1 in FIG. 1C). Furthermore, as shown in FIG. 11, when the matrix product of the three rotational (posture) matrix signals $C_{i-1}(t)$, $C_i(t)$ and $C_{i+1}(t)$ is obtained, the rotational matrices having different rotational axes are multiplied during the interval between $T_i-\tau_i$ and $T_i+\tau_i$ having the passing point i as the center. As shown in FIG. 1C, the envelope 4 traced by the rotational main axis of the end of the tool 2 is smooth between the interval between $T_i-\tau_i$ and $T_i+\tau_i$ having the passing point i as the center (the point i corresponds to the teaching point i+1 in FIG. 1C), thus preventing an abrupt change in direction of the rotational main axis.

Figure 12A:
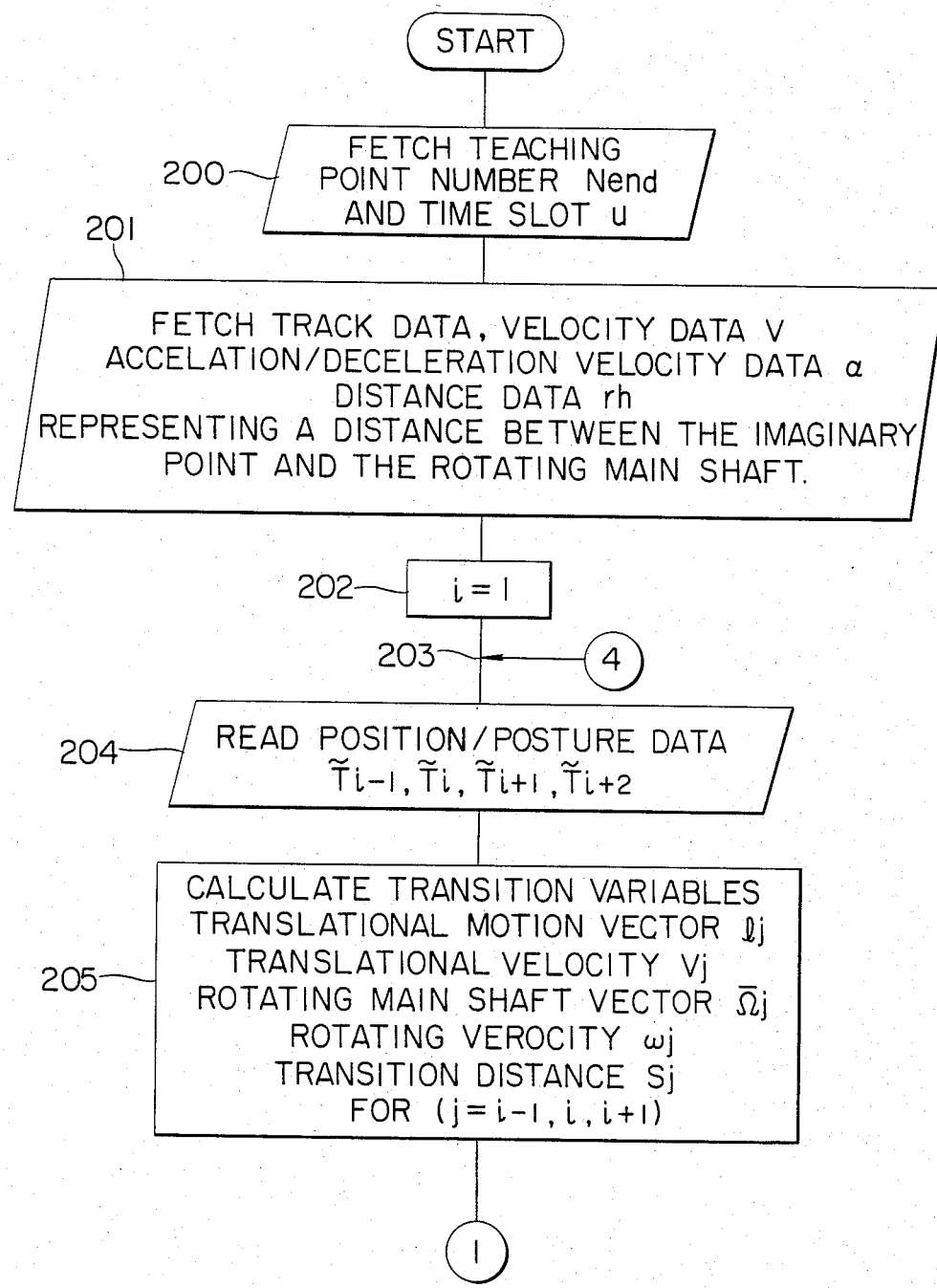

The hardware configuration of the trajectory generator according to above embodiment has been described in detail. The logic operation function can be executed in accordance with computer software. FIG. 12 is a flow chart for explaining the corresponding operation of the trajectory generator. The operation in accordance with the computer program will be described below.

When the trajectory generating program is started, in step 200, total number of teaching point Nend and time digit data u are fetched. The velocity data V, the acceleration/deceleration velocity data α and the distance data $r_h$ between the rotational main axis and the imaginary point which are defined as tracking data are fetched in step 201. The first teaching point i is set to be 1 in step 202. In step 204, the position/posture matrix data $T_{i-1}$, $T_i$, $T_{i+1}$ and $T_{i+2}$ respectively corresponding to the teaching points i-1, i, i+1 and i+2 are fetched in step 204. It should be noted that the data $T_{i-1}$ is not fetched when the teaching point i is given as the start point, and that only two data $T_i$ and $T_{i+1}$ are fetched when the teaching points comprise only the start and end points.

In step 205, the translational vector data $\bar{l}_j$, the translational velocity data $V_j$, the rotational main axis vector data $\omega_j$, the rotational velocity data $\omega_j$, and the transition distance data $S_j$ are calculated in accordance with the teaching point data and the tracking data. The transition time data $T_j$ and the acceleration/deceleration time data $\tau_j$ are calculated in step 206. The calculation procedures are the same as those described with reference with the trajectory generator shown in FIG. 4, and a detailed description thereof will be omitted.

In step 207, the time t is set to be 0. In step 209, a transition amount data $t_j$ at the time t is calculated. In step 210, the translational position vector $\bar{P}_j(t)$ at the time t is calculated. In step 211, the rotational (posture) matrix data $C_j(t)$ at the time t is calculated. Finally, in step 212, the position/posture matrix data $T(t)$ at the time t is calculated. The above operations are the same as those described with reference to the trajectory generator shown in FIG. 4, and a detailed description thereof will be omitted.

The position/posture matrix data T(t) obtained in step 212 is read out in every intervals of time digit u in step 213 and is used for the coordinate conversion program for analyzing the joint variables of the joints when the trajectory data T(t) is used to control a multilink mechanism such as a multijoint robot.

Subsequently, in order to establish the next calculation cycle, it is determined in step 214 whether or not the time t is less than the transition time $T_i$ between the teaching points i and i+1. If YES in step 214, the time digit u is added to the time t and the updated time is subsequently used as the time t in step 215. It is then determined in step 216 whether or not the updated time t exceeds the transition time $T_i$. If YES in step 216, the time t is again updated to be the transition time $T_i$ in step 217. However if NO in step 216, the flow jumps to step 218 and then returns to step 208. The operation in step 209 and the following steps are repeated, so that the position/posture matrix data T(t) are sequentially generated until NO in step 214.

When NO in step 214, the flow advances to step 219. It is then determined in step 219 whether or not the teaching point i is smaller than the total number of teaching point Nend (i.e., whether or not the tracking operation has reached the end point). If NO in step 219, the teaching point i is incremented by one in step 220, and the flow returns to step 203. Data fetching in step 204 is repeated so as to generate the trajectory for the teaching point i+1. This operation is repeated until YES in step 219. When YES in 219, the flow is ended.

Figure 13A:
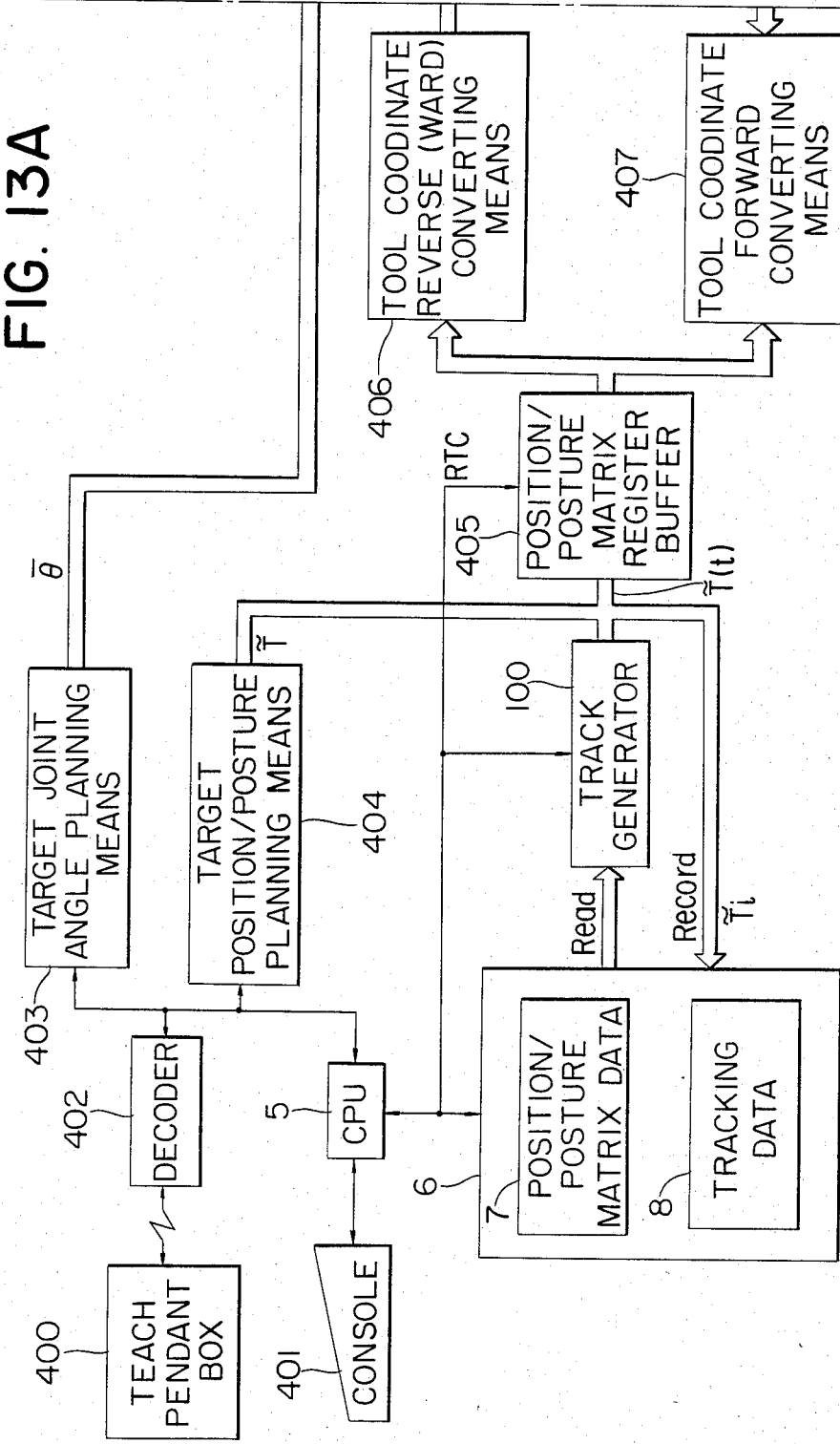

FIG. 13 is a block diagram of a tracking control system wherein the trajectory generator of the present invention is applied to a multijoint robot.

The movement modes of the position $\bar{P}_i$ of the hand 1 of the robot or the end of the tool 2 and the postures $\bar{x}_i$, $\bar{y}_i$ and $\bar{z}_i$ include (i) a teaching mode and (ii) a regeneration mode. The teaching mode includes a joint angle mode for designating a target joint angle $\theta$ by a switch mounted on a teach pendant box 400, a base coordinate mode for designating a position/posture matrix target value 40 for giving the translational and rotational movements along the $\bar{x}_O$, $\bar{y}_O$ and $\bar{z}_O$ directions, and a tool coordinate mode for designating a position/posture matrix target value 40 for giving the translational and rotational movements along the $\bar{x}_i$, $\bar{y}_i$ and $\bar{z}_i$ directions.

When switching operation is performed at the teach pendant box 400 in the joint mode, a decoder 402 drives a target joint angle designating means 403. Target joint angle data $\theta$ is supplied from the means 403 to a 6-axis servo means 410. In this case, the current joint angle data $\theta^*$, the current joint angle velocity data $\dot{\theta}^*$ and an offset current $\bar{I}$ are supplied to the 6-axis servo means 410 respectively from an encoder 413, a differentiator 411 and a motor 412. The 6-axis servo means 410 is then subjected to position feedback, velocity feedback and current feedback. An offset output from the 6-axis servo means 410 is used to drive a motor 412, so that the current joint angle finally coincides with the target joint angle $\theta$.

Switching operation is then performed at the teach pendant box 400 between the base coordinate mode and the tool coordinate mode. The decoder 402 drives a target position/posture planning means 404, so that the target position/posture matrix signal T is supplied to a position/posture matrix register buffer 405. The target position/posture matrix signal T is converted to the target joint angle $\theta$ through a tool coordinate reverseward converting means 406 and a joint coordinate reverseward converting means 408. The converted data is supplied to the 6-axis servo means 410. An output from the 6-axis servo means 410 is supplied to the motor 412, so that the motor 412 is driven to eventually coincide the current joint angle $\theta^*$ with the target joint angle $\theta$. Therefore, the tool 2 attached to the hand 1 is moved to a position represented by the target position/posture matrix signal T. In this manner, in the teaching mode, the tool 2 attached to the hand 1 can be moved to the position and posture which are targeted in the joint mode, the base coordinate mode and the tool coordinate mode. In this case, when the operator depresses the recode switch mounted on the teach pendant box 400, or types "RECODE" at a console 401, a recode instruction is fetched in the CPU 5. The current joint angle $\theta^*$ as an output from the encoder 413 directly coupled to the rotational axis of the motor 412 is converted to the position/posture matrix signal T of the tool 2 through a joint coordinate forward converting means 409 and a tool coordinate forward converting means 407. The converted data is stored in the position/posture matrix register buffer 405. More particularly, the converted data is stored (RECODE) as the position/posture matrix data $T_i$ at the teaching point i in the position/posture matrix data area 7 of the memory 6.

In the regeneration mode, the position/posture matrix data $T_{i-1}$, $T_i$ and $T_{i+1}$ of the teaching points i−1, i and i+1 which are collected in advance and stored in the position/posture matrix data area 7, the distance data $r_h$ (between the rotational main axis and the imaginary point) which is designated at the console 401 and stored by the CPU 5 in the tracking data area 8 of the memory 6, and the translational velocity V and the acceleration/deceleration velocity $\alpha$ which are given on the imaginary point are supplied to the tracking generator 100 in response to the timing signal as the READ signal from the CPU 5. As shown in FIG. 4, the trajectory generator 100 of the present invention sequentially generates the position/posture matrix signal data T(t) at times between the teaching points. The position/posture matrix signal data T(t) are supplied to the position/posture matrix register buffer 405 in response to real-time clock signals RTC from the CPU 5. The data T(t) are converted to target joint angle data $\theta$ through the tool coordinate reverseward converting means 406 and the joint coordinate reverseward converting means 408, so that the motor 412 is driven by the 6-axis servo means 410 so as to coincide the current joint angle $\theta^*$ with the target joint angle $\theta$. When the robot is moved as above mentioned, the position and posture of the tool 2 attached to the hand 1 are moved such that the actual target position/posture matrix data coincides with the target position/posture matrix data T(t). As a result, the multijoint robot can be moved in the Cartesian orthogonal coordinate space.

In the conventional tracking control of translational motion accompanying an abrupt change in posture, such tracking control being required in an assembly robot or the like, when a velocity and an acceleration velocity abruptly change, so a high-speed tracking control cannot be achieved. As a result, sufficient tracking precision cannot be obtained. Unlike the conventional tracking control, when the trajectory generator of the present invention is mounted in the tracking control system of a multijoint robot, high-speed tracking can be performed at a velocity of 1 m/s and an acceleration velocity of 1 G even if the position and posture abruptly change. In this case, the tracking error falls within 0.1 mm, thus achieving highly precise tracking control.

According to an aspect of the present invention, three translational position vector signals $\bar{P}_{i-1}(t)$, $\bar{P}_i(t)$ and $\bar{P}_{i+1}(t)$ are added with respect to individual passing points i, so that the trajectory traced by the end of the tool 2 can be an inscribed elliptical arc near to the passing points. Furthermore, since three rotational (posture) matrix signals $C_{i-1}(t)$, $C_i(t)$ and $C_{i+1}(t)$ are multiplied, the envelope 4 traced by the rotational main axis of the end of the tool 2 becomes smooth near the passing points, thus preventing abrupt change in direction of the rotational main axis.

What is claimed is:

1. A tracking control system of a multijoint robot which prepares position/posture matrix data of a plurality of teaching points and tracking data between every two adjacent teaching points and controls a trajectory of an end of a tool attached to a hand of a robot arm in accordance with the position/posture matrix data and the tracking data, comprising:

means for setting as the tracking data a velocity V and an acceleration/deceleration velocity α on a helical trajectory obtained by synthesizing an arc traced upon rotation of the tool by an imaginary point which is in a plane perpendicular to a rotational main axis of the end of a tool attached to the hand of the robot arm and is spaced by a predetermined distance $r_h$ from the rotational main axis and a straight line obtained by a translational motion of the tool attached to the hand of the robot arm;

means for calculating a translational velocity pattern and a rotational velocity pattern as components of a velocity pattern determined in accordance with the velocity V and the acceleration/deceleration velocity α on the helical trajectory; and means for generating a position/posture matrix signal for causing the multijoint robot to rotate about the rotational main axis and translate in accordance with the rotational velocity pattern and the translational velocity pattern.

2. A tracking control system of a multijoint robot which prepares position/posture matrix data $(T_{i-1}, T_i, T_{i+1}, T_{i+2}, \ldots)$, respectively corresponding to a plurality of teaching points $(i-1, i, i+1, i+2, \ldots)$ including at least one passing teaching point i and tracking data between every two adjacent teaching points, and controls a trajectory of an end of a tool attached to a hand of a robot arm in accordance with the position/posture matrix data and the tracking data, comprising:

first means for setting as the tracking data a velocity (V) and an acceleration/deceleration velocity (α) on a helical trajectory between two teaching points of the plurality of teaching points which are obtained by synthesizing an arc and a straight line to produce a helical trajectory, the arc being traced by an imaginary point upon rotation of the tool around a rotational main axis thereof, the imaginary point being in a plane perpendicular to said rotational main axis and being spaced apart by a predetermined distance $(r_h)$ from said rotational main axis, and the straight line being traced upon translational motion of said tool;

second means for calculating as a transition amount signal an integrated value ($t_j$ where $j = i-1, i, i+1$) of a velocity pattern at time (t) on the helical trajectory between the two adjacent teaching points of said plurality of teaching points, a translational velocity data ($V_j$ where $j = i-1, i, i+1$) and a rotational velocity data ($\omega_j$ where $j = i-1, i, i+1$) around said rotating main axis as components of the velocity pattern on the helical trajectory between the two adjacent teaching points in accordance with the velocity (V) and the acceleration/deceleration velocity (α) on the helical trajectory and the position/posture matrix data $(T_{i-1}, T_i, T_{i+1}$ and $T_{i+2})$;

third means for calculating translational position vector data $(\bar{P}_{i-1}(t), \bar{P}_i(t)$ and $\bar{P}_{i+1}(t))$ in accordance with the integrated value ($t_j$) of the velocity pattern at the time (t), the translational velocity data ($V_j$) and a translational vector ($\bar{l}_j$) thereof;

fourth means for calculating rotational posture matrix data $(C_{i-1}(t), C_i(t)$ and $C_{i+1}(t))$ in accordance with the integrated value ($t_j$) of the velocity pattern at the time (t), the rotational velocity data ($\omega_j$) and a rotational main axis vector ($\Omega_j$) derived therefrom;

fifth means for adding the translational position vector data $(\bar{P}_{i-1}(t), \bar{P}_i(t), \bar{P}_{i+1}(t))$ for a position vector component $(\bar{P}_i)$ of the position/posture matrix data $(T_i)$ corresponding to the teaching point (i), thereby obtaining a position vector signal $(\bar{P}(t))$ of said tool; and sixth means for multiplying the rotational posture matrix data $(C_{i-1}(t), C_i(t)$ and $C_{i+1}(t))$ for a posture matrix component $C_i$ of the position/posture matrix data $(T_i)$, thereby obtaining a posture matrix signal $(C(t))$ of said tool.

3. A system according to claim 2, further comprising a memory for storing the position/posture matrix data and the tracking data.

4. A system according to claim 2, wherein said second means has transition variable calculating means for calculating the translational velocity ($V_j$) and the translational vector ($\bar{l}_j$) thereof, the rotational velocity ($\omega_j$) around said rotational main axis and the rotational main axis vector ($\Omega_j$), and a transition distance ($S_j$ where $j = i-1, i$, and $i+1$) of the imaginary point in accordance with the position/posture matrix data $(T_{i-1}, T_i, T_{i+1}, T_{i+2})$ and the tracking data ($r_h$, V and α).

5. A system according to claim 4, wherein said transition variable calculating means comprises a tanslational vector calculation circuit which has:

vector selectors for selecting a set of position vector signal components $(\bar{P}_j, \bar{P}_{j+1})$, in response to a teaching point interval selection signal (TPS), from the position vector component signals $(\bar{P}_{i-1}, \bar{P}_i, \bar{P}_{i+1}, \bar{P}_{i+2})$ of the position/posture matrix data which are read out from said memory and which correspond to the plurality of teaching points $(i-1, i, i+1, i+2)$;

a vector subtracter for calculating a vector difference $(\bar{P}_{j+1} - \bar{P}_j)$ between the selected set of position vector signal components; and a unit vector circuit for converting to a unit vector an output generated from said vector subtracter.

6. A system according to claim 4, wherein said transition variable calculating means comprises a translation distance calculation circuit which has:

vector selectors for selecting a set of position vector signal components $(\bar{P}_j, \bar{P}_{j+1})$, in response to a teaching point interval selection signal (TPS), from the position vector component signals $(\bar{P}_{i-1}, \bar{P}_i, \bar{P}_{i+1}, \bar{P}_{i+2})$ of the position/posture matrix data which are read out from said memory and which correspond to the plurality of teaching points $(i-1, i, i+1, i+2)$;

a vector subtracter for calculating a vector difference $(\bar{P}_{j+1} - \bar{P}_j)$ between the selected set of position vector signal components;

a vector absolute value circuit for converting the vector difference to an absolute value to calculate a translational distance signal ($L_j$);

a matrix selector for selecting a set of posture matrix signal components ($C_j$, $C_{j+1}$) in response to a teaching point interval selection signal (TPS) in accordance with the posture matrix component signals ($C_{i-1}$, $C_i$, $C_{i+1}$, $C_{i+2}$) of the position/posture matrix data;

a rotational angle signal calculation circuit circuit, having vector inner product circuits, first scalar adders, a first scalar multiplier, and an arccosine circuit, for calculating a rotational angle signal ($\xi_j$) in accordance with the following equations:

$$U_j = \{(\bar{x}_j \cdot \bar{x}_{j+1}) + (\bar{y}_j \cdot \bar{y}_{j+1}) + (\bar{z}_j \cdot \bar{z}_{j+1}) - 1\}/2$$

$$\xi_j = \cos^{-1} U_j$$

for $j = i-1$, $i$, and $i+1$; and a transition distance calculation circuit having second scalar multipliers for multiplying the distance signal ($r_h$) read out from said memory and the rotational angle signal ($\xi_j$) and squaring a product, respectively, a second scalar adder for adding the product $((r_h \cdot \xi_j)^2)$ generated from said second scalar multipliers to a squared signal ($L_j^2$) obtained such that the translational distance signal ($L_j$) generated from said absolute value circuit is squared by a third scalar multiplier, and a first square root circuit for calculating a square root of an output from said second scalar adder, said transition distance calculation circuit being arranged to calculate the transition distance ($S_j$).

7. A system according to claim 6, wherein said transition variable calculating means comprises:

a control signal generating circuit, having a fourth scalar multiplier, a first scalar divider and a comparator, for calculating a ratio ($V^2/\alpha$) of a squared value of the velocity signal (V) to the acceleration/deceleration velocity ($\alpha$) in accordance with the velocity signal (V) and the acceleration/deceleration velocity ($\alpha$), comparing the ratio with the transition distance signal ($S_j$) generated from said transition distance calculation circuit, and for generating the control signal (LAS) for switching between a trapezoidal velocity pattern and a triangular velocity pattern;

a square root calculation circuit, having a fifth scalar multiplier and a second square root circuit for calculating a square root ($\sqrt{\alpha \cdot S_j}$) of a product of the transition distance signal ($S_j$) and the acceleration/deceleration velocity signal ($\alpha$);

a scalar selector for selecting one of the velocity signal (V) and the square root ($\sqrt{\alpha \cdot S_j}$) generated from said square root calculating circuit in response to the control signal used to switch between the trapezoidal velocity pattern and the triangular velocity pattern, and for generating a signal ($S_j$);

a translational velocity calculation circuit, having a second scalar divider and a sixth scalar multiplier, for dividing the translational distance ($L_j$) by the transition distance ($S_j$) to obtain a first quotient ($L_j/S_j$) and for multiplying the first quotient ($L_j/S_j$) with the signal ($S_j$) generated from said scaler selector to obtain the translational velocity ($V_j$); and a rotational velocity calculation circuit, having a third scalar divider and a seventh scalar multiplier, for dividing the rotational angle signal ($\xi_j$) by the transition distance ($S_j$) to obtain a second quotient ($\xi_j/S_j$) and for multiplying the second quotient ($\xi_j/S_j$) with the signal ($S_j$) generated from said scalar selector to obtain the rotational velocity ($\omega_j$)

8. A system according to claim 4, wherein said transition variable calculating means comprises a rotational main axis vector calculation circuit having:

matrix selectors for selecting a set of posture matrix signal components ($C_j$, $C_{j+1}$) from the posture matrix component signals ($C_{i-1}$, $C_i$, $C_{i+1}$, $C_{i+2}$) of the position/posture matrix data in response to a teaching point interval selection signal (TPS);

a plurality of vector multipliers for obtaining products of column vector components of the posture matrix signal components $C_j$, $C_{j+1}$) selected by said matrix selectors;

a vector adder for calculating a sum of the outputs from said plurality of vector multipliers;

a unit vector circuit for converting to a unit vector an output generated from said vector adder, thereby calculating the rotational main axis vector.

9. A system according to claim 4, wherein said second means comprises transition time calculating means for calculating a transition time ($T_j$ where $j = i-1$, $i$, and $i+1$) between every two adjacent teaching points and an acceleration/deceleration time ($\tau_j$ where $j = i-1$, $i$, and $i+1$) in accordance with the transition distance signal ($S_j$) generated from said transition variable calculating means, and the velocity signal (V) and the acceleration/deceleration velocity signal ($\alpha$) which are read out from said memory.

10. A system according to claim 9, wherein said transition time calculating means comprises:

a first scalar divider for dividing the velocity signal (V) by the acceleration/deceleration velocity signal ($\alpha$) to calculate the acceleration/deceleration time ($\tau_j = V/\alpha$) for a trapezoidal velocity pattern;

an operation circuit having a second scalar divider for dividing the transition distance signal ($S_j$) by the acceleration/deceleration velocity signal ($\alpha$) and a square root circuit for calculating a square root of an output generated from said second scalar divider, said operation circuit being arranged to calculate a acceleration/deceleration time ($\sqrt{S_j/\alpha}$) corresponding to a triangular velocity pattern;

a control signal generating circuit having a first scalar multiplier for squaring the specified velocity signal (V), a third scalar divider for dividing an output generated from said first scalar multiplier by the acceleration/deceleration signal ($\alpha$), and a comparator for comparing an output ($V^2/\alpha$) generated from said third scalar divider and the transition distance signal ($S_j$), said control signal generating circuit being arranged to generate a control signal for switching between the trapezoidal and triangular velocity patterns;

a first scalar selector for selecting one of the acceleration time ($V/\alpha$) corresponding to the trapezoidal velocity pattern and the acceleration/deceleration time ($\sqrt{S_j/\alpha}$) corresponding to the triangular velocity pattern in response to the control signal;

a transition time signal calculation circuit having a fourth scalar divider for dividing the transition distance signal ($S_j$) by the velocity signal (V), a second scalar multiplier for multiplying by $\frac{1}{2}$ the acceleration/deceleration time signal ($\tau_j$) generated from said first scalar selector, a first scalar adder for adding an output ($V/\alpha$) generated from said fourth scalar divider and an output generated from said first scalar selector, a second scalar adder for doubling the output from said first scalar selector, and a third scalar adder for adding the output generated from said fourth scalar divider and the output from said second scalar multiplier, said transition time signal calculation circuit being arranged to calculate various transition time signals determined in accordance with conditions of the teaching point and velocity pattern;

a second scalar selector for calculating a transition time signal ($S_j/V + \tau_j$ or $2\tau_j$) representing that the corresponding teaching points are a start point and an end point, in response to the control signal;

third and fourth scalar selectors for calculating transition time signals ($S_j/V + \frac{1}{2}\tau_j$ or $\tau_j$) representing that the corresponding teaching points are the start and passing points and that the corresponding teaching points are the passing and end points, respectively, in response to the control signal;

a fifth scalar selector for calculating a transition time signal ($S_j/V$ or $\tau_j$) representing that the corresponding teaching points are the passing points, in response to the control signal; and a sixth scalar selector for selecting as the transition time signal ($T_j$) one of the transition time signals generated from said second, third, fourth and fifth scalar selectors, in response to the control signal (SPE) representing whether the teaching point is the start point, the passing point or the end point.

11. A system according to claim 4, wherein said second means has transition amount calculating means for calculating the integrated value ($t_j$) at the time (t) in accordance with the time signal (t) having each teaching point as the start point, the transition time signal ($T_j$) generated from said transition time calculating means, and the acceleration/deceleration time signal ($\tau_j$)

12. A system according to claim 11, wherein said transition amount calculating means comprises:

a signal processing circuit, comprising a first scalar divider, a first scalar multiplier and first scalar subtracters, for preparing a plurality of signals ($T_j - \tau_j/2$, $\tau_j/2$, $T_j - \tau_j$, $\tau_j$) for determining which portion of the velocity pattern corresponds to a currently generated trajectory in accordance with the transition time signal ($T_j$) generated from said transition time calculating means and the acceleration/deceleration time signal ($\tau_j$);

signal generating means, having a plurality of comparators for comparing the plurality of signals with the time signal (t), for generating a first signal (PD) to be selected to control such that the currently used teaching point is the passing point and the currently generated trajectory corresponds to a deceleration period of the velocity pattern, a second signal (PA) to be selected to control such that the currently used teaching point is the passing point and the currently generated trajectory corresponds to an acceleration period of the velocity pattern, a third signal (ED) to be selected to control such that the currently used teaching point is the end point and the currently generated trajectory corresponds to the deceleration period of the velocity pattern, and a fourth signal (SA) to be selected to control such that the currently used teaching point is the start point and the currently generated trajectory corresponds to the acceleration period of the velocity pattern;

a transition amount generator, having second scalar dividers, second scalar multipliers, scalar adders, and the second scalar subtracters, for receiving the transition time signal ($T_j$), the acceleration/deceleration time signal ($\tau_j$), and the time signal (t), for calculating the integrated values at the time (t) between the start and passing points, between the start and end points, between the passing and end points, and between the passing points, and for generating the transition amount signals;

a selector circuit having first and second selectors for selecting the transition amount signals between the start and passing points in response to the first signal (PD) and the fourth signal (SA), respectively, third and fourth scalar selectors for selecting the transition amount signals between the start and end points in response to the third signal (ED) and the fourth signal (SA), respectively, fifth and sixth scalar selectors for selecting the transition amount signals between the passing and end points in response to the third signal (ED) and the second signal (PA), respectively, and seventh and eighth scalar selectors for selecting the transition amount signals between the passing points in response to the first signal (PD) and the second signal (PA), respectively; and a ninth scalar selector for selecting as the transition amount signal ($t_j$) at the time (t) one of the four transition amount signals generated from said selector circuit, said one of the four transition amount signals being associated with the currently generated trajectory.

13. A system according to claim 2, wherein said third means comprises: a scalar multiplier for calculating a product of the transition amount signal ($t_j$) as the integrated value of the velocity pattern at the time (t) and the translational velocity signal ($V_j$); and a vector parameter product circuit for calculating a product of an output from said scalar multiplier and the translational vector signal ($l_j$).

14. A system according to claim 2, wherein said fourth means comprises:

a rotational angle calculation circuit, having a first scalar multiplier and a cosine circuit, for calculating a rotational angle about the rotational main axis up to the time (t) in accordance with the rotational angle velocity signal ($\omega_j$) and the transition amount signal ($t_j$) at the time (t); and a rotational matrix signal calculation circuit, having scalar adders, scalar subtracters, second scalar multipliers and a square root circuit, for calculating $3 \times 3$ rotational matrix elements in accordance with the calculated rotational angle about the rotational main axis up to the time (t) and three components ($\Omega_j(1)$, $\Omega_j(2)$, and $\Omega_j(3)$) of the rotational main axis vector signals ($\Omega_j$), and for generating the rotational matrix signal ($C_j(t)$).

15. A system according to claim 2, wherein said fifth means comprises vector adders for adding the translational position vector component ($\overline{P}_i$) and the translational position vector signals ($\overline{P}_{i-1}(t)$, $\overline{P}_i(t)$, and $\overline{P}_{i+1}(t)$) generated from said third means.

16. A system according to claim 2, wherein said sixth means comprises matrix product circuits for calculating a product of the posture matrix signal component ($C_i$) and the rotational posture matrix signals ($C_{i-1}(t)$, $C_i(t)$, and $C_{i+1}(t)$) generated from said fourth means.

17. A method for controlling a movement of an arm of a multijoint robot to prepare position/posture matrix data ($T_{i-1}$, $T_i$, $T_{i+1}$, $T_{i+2}$, . . . ), respectively corresponding to a plurality of teaching points (i−1, i, i+1, i+2, . . . ), and tracking data between every two adjacent teaching points, and to control a trajectory of an end of a tool attached to a hand of the arm in accordance with the position/posture matrix data and the tracking data, comprising the steps of:

(a) setting as the tracking data a velocity (V) and an acceleration/deceleration velocity ($\alpha$) on a helical trajectory between two teaching points of the plurality of teaching points which are obtained by synthesizing an arc and a straight line to produce a helical trajectory, the arc being traced by an imaginary point upon rotation of the tool around a rotational main axis thereof, the imaginary point being perpendicular to said rotational main axis and being spaced apart by a predetermined distance ($r_h$) from said rotational main axis, and the straight line being traced upon translational motion of said tool;

(b) calculating an integrated value ($t_j$ where j=i−1, i, i+1) of a velocity pattern at time (t) on the helical tracking between the two adjacent teaching points of said plurality of teaching points, a translational velocity data ($V_j$ where j=i−1, i, i+1) and a rotational velocity data ($\omega_j$ where j=i−1, i, i+1) around said rotating main axis as components of the velocity pattern on the helical trajectory between the two adjacent teaching points in accordance with the velocity (V) and the acceleration/deceleration velocity ($\alpha$) on the helical trajectory and the position/posture data ($T_{i-1}$, $T_i$, $T_{i+1}$ and $T_{i+2}$);

(c) calculating translational position vector data ($P_{i-1}(t)$, $P_i(t)$ and $P_{i+1}(t)$) in accordance with the integrated value ($t_j$) of the velocity pattern at the time (t), the translational velocity data ($V_j$) and a translational vector ($l_j$) thereof;

(d) calculating rotational posture matrix data ($C_{i-1}(t)$, $C_i(t)$ and $C_{i+1}(t)$) in accordance with the integrated value ($t_j$) of the velocity pattern at the time (t), the rotational velocity data ($\omega_j$) and a rotational main axis vector $\Omega_j$) thereof;

(e) adding the translational position vector data ($P_{i-1}(t)$, $P_i(t)$, $P_{i+1}(t)$) for a position vector component ($P_i$) of the position/posture matrix data ($T_i$) corresponding to the teaching point (i), thereby obtaining a position vector signal (P(t)) of said tool;

(f) multiplying the rotational posture matrix data ($C_{i-1}(t)$, $C_i(t)$ and $C_{i+1}(t)$) for a posture matrix component ($C_i$) of the position/posture matrix data ($T_i$), thereby obtaining a posture matrix signal (C(t)) of said tool; and (g) converting the position vector signal (P(t)) of the tool and the posture matrix signal (C(t)) to a target joint angle of the tool and driving a motor mounted on a joint of the robot to coincide a current joint angle with the target joint angle.

\* \* \* \* \*